United States Patent
Islam et al.

(10) Patent No.: US 9,904,585 B1
(45) Date of Patent: Feb. 27, 2018

(54) ERROR HANDLING IN EXECUTING WORKFLOW STATE MACHINES

(71) Applicant: Amazon Technologies, Inc., Seattle, WA (US)

(72) Inventors: Zakiul Islam, Vancouver (CA); Aaron-Kenneth Karl Rehaag, Vancouver (CA); Timothy William Bray, Vancouver (CA); Paritosh Mohan, Seattle, WA (US); Yuke Yang, Vancouver (CA); Jonathan Lewis Clark, Vancouver (CA); Huangdong Meng, Vancouver (CA); Nathan Andrew Schnarr, Vancouver (CA); Luc Rémi Ponnau, Vancouver (CA)

(73) Assignee: Amazon Technologies, Inc., Reno, NV (US)

(*) Notice: Subject to any disclaimer, the term of this patent is extended or adjusted under 35 U.S.C. 154(b) by 108 days.

(21) Appl. No.: 14/876,555

(22) Filed: Oct. 6, 2015

(51) Int. Cl.
G06F 11/00 (2006.01)
G06F 11/07 (2006.01)
G06F 9/48 (2006.01)

(52) U.S. Cl.
CPC .......... *G06F 11/079* (2013.01); *G06F 9/4881* (2013.01); *G06F 11/0721* (2013.01)

(58) Field of Classification Search
CPC .............. G06F 11/079; G06F 11/0757; G06F 11/0751; G06F 11/0709; G06F 11/1402; G06F 11/0793; G06F 11/28; G06F 11/0721; G06F 9/4881
See application file for complete search history.

(56) References Cited

U.S. PATENT DOCUMENTS

| | | | | |
|---|---|---|---|---|
| 5,832,455 A * | 11/1998 | Hayashi | ................. | G06Q 10/06 705/7.15 |
| 5,930,512 A | 7/1999 | Boden et al. | | |
| 6,988,139 B1 * | 1/2006 | Jervis | .................... | G06F 9/5038 709/224 |
| 7,840,857 B2 * | 11/2010 | Breiter | ................ | G06F 11/0709 714/48 |
| 8,185,423 B2 * | 5/2012 | Brook | .................... | G06Q 10/06 370/230 |
| 8,381,214 B2 * | 2/2013 | Theimer | ............... | G06F 9/5027 718/102 |

(Continued)

OTHER PUBLICATIONS

Business Process Model and Notation, Jan. 2011, OMG, Version 2.0, 538 pages.*

*Primary Examiner* — Marc Duncan
(74) *Attorney, Agent, or Firm* — Robert C. Kowert; Meyertons, Hood, Kivlin, Kowert & Goetzel, P.C.

(57) ABSTRACT

A workflow interpreter service that interprets a workflow definition language for specifying a workflow definition. Further, the workflow definition language provides features for maintaining control over data flows for data that is passed from one state to another among states of a state machine for a workflow and features for handling errors that may occur within any given state of a workflow state machine. Such control over data flow in between states allows for a given workflow to be processed incrementally, and among multiple different computing resources. Further, the workflow definition language error handling features provide for robust error handling within the state machine framework corresponding to workflow.

20 Claims, 14 Drawing Sheets

(56) References Cited

U.S. PATENT DOCUMENTS

| | | | |
|---|---|---|---|
| 8,631,283 B1* | 1/2014 | Sivasubramanian | G06F 9/5061 714/47.1 |
| 8,806,490 B1* | 8/2014 | Pulsipher | G06F 9/4881 718/100 |
| 9,292,342 B2* | 3/2016 | Wolf | H04L 67/10 |
| 2002/0161859 A1* | 10/2002 | Willcox | G06F 9/466 709/219 |
| 2003/0018508 A1* | 1/2003 | Schwanke | G06Q 10/0631 705/7.26 |
| 2004/0139144 A1 | 7/2004 | Batra et al. | |
| 2005/0022164 A1 | 1/2005 | Takacsi-Nagy | |
| 2009/0158281 A1* | 6/2009 | Omori | G06F 9/5038 718/101 |
| 2013/0144933 A1* | 6/2013 | Hinni | H04L 67/16 709/202 |
| 2015/0032500 A1* | 1/2015 | Cope | G06Q 10/06311 705/7.28 |
| 2016/0041846 A1* | 2/2016 | Bartlett | G06Q 10/0633 718/104 |
| 2016/0224425 A1* | 8/2016 | Hives | G06F 9/542 |

* cited by examiner

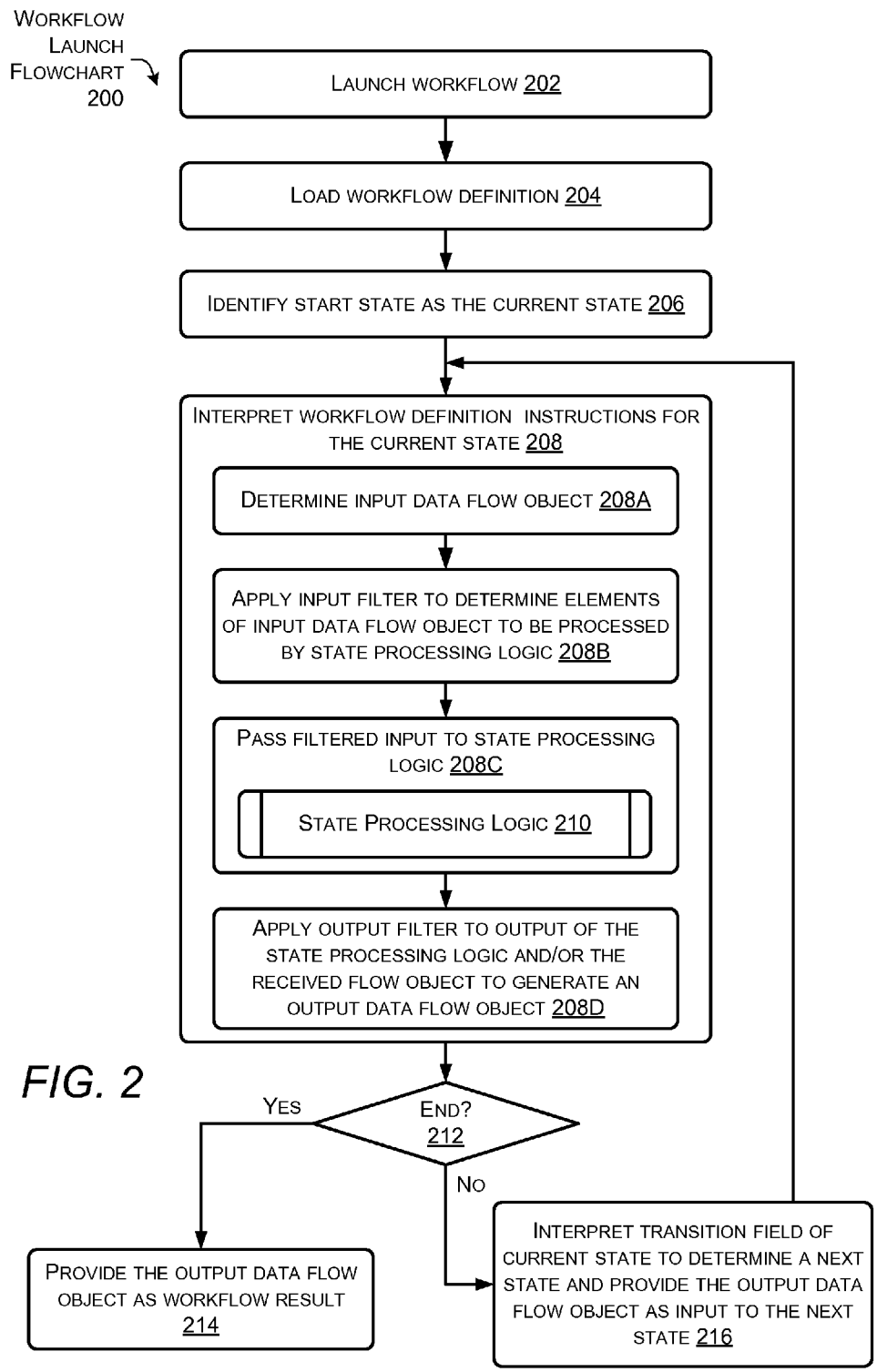

TIMEOUT HANDLING FLOWCHARTS 600

ERROR HANDLING IN EXECUTING
WORKFLOW STATE MACHINES

BACKGROUND

Web service providers, and provider networks in general, often allow customers to specify a workflow that accomplishes a set of computational tasks to solve a given computational problem, logistical problem, or generally any process that may be directed by a computer system. In some cases, a workflow may also be executed on a local client computing device.

Traditional approaches for providing workflow services usually rely on tools providing for selections of sequences of tasks. However, such traditional approaches fail to provide a user defining a workflow with broad flexibility in specifying data flow manipulation, data flow object integrity as transitions are made in between states of a workflow as the workflow is processed, and robust error handling within the framework of the processing of state machines for workflows. Further, these features for specifying error handling between states of a workflow state machine are provided through a language that is specific to defining workflows.

BRIEF DESCRIPTION OF DRAWINGS

FIG. 2 illustrates workflow launch flowchart depicting example operations performed in processing a workflow with the workflow interpreter according to some implementations.

Figure 1A:
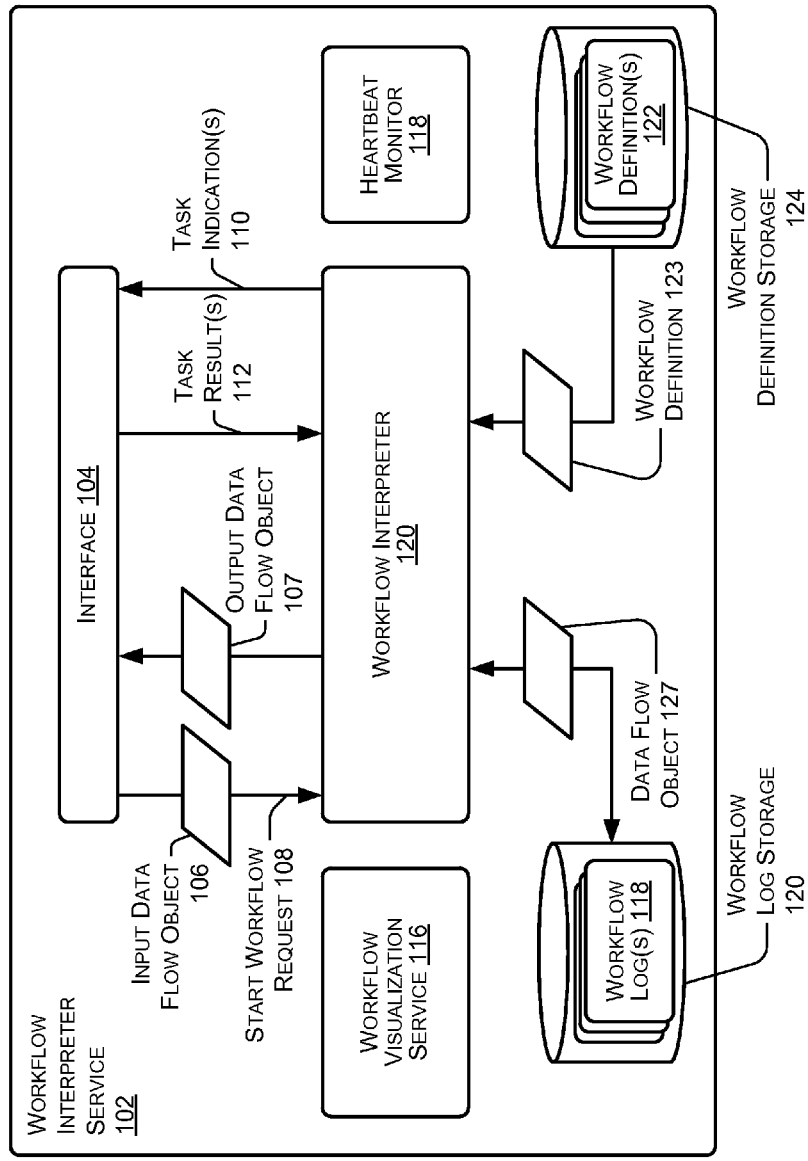
FIG. 1A is an illustrative architecture depicting an example workflow interpreter service according to some implementations.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean inclusive of, but not limited to.

DETAILED DESCRIPTION

The systems and techniques described in this disclosure specify implementations of a workflow definition language defining language features for specifying workflows and features for handling data flow in between states of a workflow state machine and for handling error conditions that may occur within any given state of the workflow state machine. A workflow may be executed by a workflow interpreter that evaluates a workflow definition that includes definitions of states of a state machine for the workflow. Further, these states of the state machine for a workflow, including transitions between states, and tasks to be performed at each state, and the flow of data objects between the states may be controlled and specified according to the workflow definition language.

In general, a workflow may be defined to perform any particular operation such as handling and fulfilling orders for a merchant website, aggregating data analytics, or any computational operation that includes one or more computational steps or one or more computational tasks. In some cases, the particular operation performed by the workflow may include one or more sequential or parallel steps or tasks that may be defined through a workflow development platform, where a user may specify inputs, outputs, and the steps or tasks, including any parallel execution or sequential execution of the steps or tasks. In this way, a user may define, visually through a graphical user interface, or through coding of a workflow definition using the workflow definition language, or through a combination of both, a state machine of units of work for accomplishing the computation operation for which the workflow is being defined.

In some implementations, a workflow interpreter may be implemented as a stand-alone service executing on, for example, a client computing device. In other implementations, a workflow interpreter may be implemented as part of a workflow service of a provider network that is architecturally structured to provide workflow service to multiple different clients. Such a workflow service may provide registration of workflow definitions and execution of a workflow corresponding to the workflow definition. Further, the architecture of the workflow service may allow parallel execution of multiple different workflows across multiple host computers within a provider network. In particular, the workflow service may provide continuous execution of given workflows without dedicating computing resources for executing the workflow in between states of the workflow, which allows different host computers within the provider network to work on a single given workflow at different points in time—and preventing idle dedication of computing resources for servicing a given workflow.

The workflow definition language may allow a user to specify a workflow in with great detail, and with greater complexity than would otherwise be provided to a user with traditional tools for developing workflows. In some implementations, the workflow definition language includes language features for specifying a workflow in terms of states of a state machine for the workflow. For example, the syntax of a single state of a workflow state machine may be specified to be a JavaScript Object Notation (JSON) object.

However, in different embodiments, the syntax and grammar for specifying a state or features of a workflow may be different. Instead, as described in this disclosure, the computational environment created by use of the workflow definition language may be implemented using different language syntax. For example, the computation environment created by use of a workflow definition language may provide features for—among other features—ensuring data flow integrity in between state transitions, manipulation of data flow objects through the use of filters that may be applied upon entering and upon exiting a state, specifying how parallel tasks may be invoked, specifying how the output from parallel tasks may be combined, providing robust error handling, and enabling a single workflow to be executed by different computing resources at different times. Therefore, while the examples of a workflow definition language are provided in a JSON syntax, this is not intended to be limiting, but rather, other syntax choices are possible.

As a basic example of a workflow, a user may use the workflow definition language to create a workflow with a single state, where the single state is defined to call a single task. TABLE 1 illustrates an example workflow definition for this workflow.

TABLE 1

{
  "Adder": {
    "type": "task",
    "resource": "<resource_pathname>:Add",
    "start" = true,
    "end" = true
    }
}

In this example workflow definition, there is a single state, "Adder", where "type" field indicates that a task may be called within this state, where the task is provided by a resource, or service, identified by "<resource_pathname>", and where the task name is "Add". Inputs to the "Add" task call are described below.

Further in this example, the "start" field indicates that this is the first state of a workflow state machine. In this example, a state with a "start" field is the first state executed when the workflow is launched. In this example, the "end" field may indicate that this state is the last, or end state of the workflow, and consequently, that any output of this end state may be the result provided as the output of the workflow.

However, in other examples, where a state definition does not include an "end" field, the workflow interpreter may determine a transition to be made to another state of the workflow. In this way, the workflow interpreter determines transitions between states of a workflow, and in evaluating the state definitions for each state, the workflow interpreter executes the workflow.

Continuing with this example, the workflow interpreter may, in evaluating this state, reach the "resource" field which calls the "Add" function. An example of the "Add" function may be defined as illustrated in TABLE 2.

TABLE 2 function Add(input)   {
    var args = JSON.parse(input);
    var sum = args.operand1 + args.operand2;
    return JSON.stringify({"sum": sum});
    }

In this example workflow, the "Add" function is implemented at a resource location identified by the "<resource_pathname>" prefix to the function call, where the resource location may be a local service, a remote, third-party service, or a service provided by a client computing device or service.

Given the above workflow definition, the workflow may be launched with input equal to, for example, "{'operand1': 3, 'operand2': 2}", and a result may be in the form of "{'sum': 5}".

In general, a state of a workflow may be defined in the workflow definition according to fields at a top level of the state's JSON object, where a name for the state may be defined first, as depicted in TABLE 1. Further, a transition to another state from a current state may be defined as illustrated in TABLE 3.

TABLE 3

"MiddleState": {
  "type" = "task",
  "resource" = "<resource_pathname>:HelloWorld",
  "transitions" = "AfterMiddleState",
  },
"AnotherState1": { . . . },
"AnotherState2": { . . . },
"AfterMiddleState": { . . . }

In this example, the "MiddleState" state is reached some time after the initial state is launched. Further, this example of "MiddleState" is a snippet without the enclosing parenthesis provided by an initial state, as depicted above with regard to TABLE 1. Further in this example, the "transitions" field identifies "AfterMiddleState" as the next state after the workflow interpreter completes the execution or evaluation of the "MiddleState". As described above, the "MiddleState" is of type "task", and makes a call to the "HelloWorld" function provided at a resource location identified by "<resource_pathname>".

In this way, a workflow may be processed as the workflow interpreter evaluates and executes the states of the state machine for the workflow, where an execution path—or a sequence of transitions between states of the state machine—is defined according the transition fields of the state. In other words, while the "AfterMiddleState" state definition does not follow the "MiddleState" state definition in the workflow definition snippet depicted in TABLE 2, a transition is made from "MiddleState" to "AfterMiddleState" according the transition definition in the "MiddleState" state definition, and not according to a ordering of state definitions as they are defined within a workflow definition.

Further, in general, each state that is not a terminal state, may define a transition state to transition to after the current state is evaluated. In other state definitions, other fields may be defined, as discussed below.

As the workflow interpreter evaluates a current state, the next state as defined according to a "transitions" field may be determined after any tasks for the current state have been called and after results from the tasks have been received. In other examples, for states without calls to tasks, the workflow interpreter may reach the "transitions" field after evaluating other fields or declarative statements in the state definition. In this way, the workflow interpreter may transition evaluation of a next state in the workflow according to a "transitions" field for the current state. While most states may have a single transition, or transition rule, multiple transitions to other states may be defined, as described below.

In evaluating the states of a state machine for a workflow according to a workflow definition, the workflow interpreter manages a data flow from state to state according to data filters that may be applied on entering a state and exiting a state, and according to transitions from state to state. In some cases, if not filters are applied to output data or to the input data flow object, default behavior for transitioning out of a current state is to echo the input data flow object as the output data flow object to be passed to a next state.

For example, as described above with regard to the workflow definition in TABLE 1, an input to a workflow, provided upon launch of the workflow, may be a data object, referred to herein as a data flow object.

In some implementations, a data flow generally describes data that is passed from state to state as the workflow interpreter transitions from state to state as the workflow is processed. In some cases, a data flow does not correspond to a single path through evaluated states, and instead, a data flow may split and rejoin in accordance with parallel processing of tasks or parallel processing of workflows within workflows.

In processing a state machine for a workflow, the workflow interpreter may maintain a log of data flow objects, where the log of data flow objects may store an instance of a data flow object at different points in the evaluation of a state machine. For example, when a workflow is initially launched, the workflow may be launched with an input representing an initial data flow object. This initial data flow object may be stored in a workflow data flow log for the workflow, where the initial data flow object may be identified as the input data flow object to the initial state. Similarly, after the initial state is evaluated by the workflow interpreter and an output data flow object for the initial state has been determined, the workflow interpreter may store an instance of the output data flow object, where the output data flow object may be identified as the output data flow object of the initial state.

In this way, the workflow interpreter does not need to maintain a processing context for the workflow. Instead, the workflow interpreter may pause, or otherwise be interrupted, and processing of the workflow may resume using the workflow data flow log to determine what a current data flow object should be for a current state. In the example below with a workflow interpreter implemented in the context of a provider network workflow service, the use of a workflow data flow log aids in processing of a workflow to be performed incrementally, where each incremental processing of the workflow may be performed by different computing resources in such a way that a current state of the workflow state machine may be determined a workflow definition for the workflow and from log information, including a workflow data flow log and a workflow log of events related to processing the workflow.

In different implementations, a data flow object may be a JSON object, or some other structured data format. In some cases, the contents of the data flow object may be numbers, Booleans, strings, or in general, any standard or proprietary data type.

Further, as described further below, data flow objects may be manipulated and changed as the workflow interpreter evaluates a given state definition of the workflow state machine. In some cases, a given state may restrict inputs to be used within the state based on an application of one or more input filters to the contents of the incoming data flow object to the given state.

Similarly, a given state may define an output flow data object based on an application of one or more output filters to the output of any processing or task output for tasks called from the given state. In some cases, the one or more output filters may be applied to—instead of or in addition to being applied to the output generated in processing the given state—the incoming data flow object as it existed when provided to the given state as input when the given state was transitioned to from a previous state.

In some embodiments, a state definition for a state of a workflow state machine may be defined to include a workflow definition language features for defining default behaviors.

In some embodiments, default behavior may be defined for evaluating state definitions of a workflow state machine. For example, an output data flow object for a state may echo their inputs as outputs. In other words, the state does not alter the input data flow object and the input data flow object is provided as an output data flow object.

As an example data flow, and with regard to the "Adder" workflow defined in TABLE 1, the "Adder" workflow may be launched with an input data flow object equal to "{'numbers': [3, 4]}". This input data flow object is received by initial state "Adder", and the initial state makes a call to an "Add" function provided at resource location "<resource_pathname>". An example data flow for the "Adder" workflow is depicted in TABLE 4.

TABLE 4

"Adder":
    INPUT: {"numbers": [3, 4]}
    OUTPUT: {"result": 7}

In this example, the "Adder" workflow has only a single state, "Adder", and the input and output data flow object contents are illustrated in TABLE 4. In other examples, additional states may be listed in the order that the states are evaluated, and the data flow objects as they enter and exit a given state provide a record of the state of the data flow for the workflow at a given point in the state machine. In some cases, when a state provides no output, the data flow object may be empty, and may be depicted in the example above as "{ }", indicating an empty output data flow object. Other options for representing no output may be defined. Further, in some examples, the workflow data flow logs may be defined in a format similar to the format illustrated in TABLE 4.

In some embodiments, a notation may be defined for accessing a subtree or member of a data flow object. For example, the data flow object depicted in TABLE 5 may be passed as a data flow object input to a state of the workflow state machine.

TABLE 5

```
{
    "foo": 123,
    "bar": ["a", "b", "c"]
    "car": {"cdr": true}
}
```

In this example, the different members of the data flow object may be referenced using a defined notation, for example, a default input data flow object name may be defined to be "dataflowobject", and a member of the data flow object in TABLE 4 may be referenced using "$dataflowobject.foo"—a statement that if present in the state definition of a state of the workflow state machine, would be evaluated by the workflow interpreter to be number 123. Similarly, "$dataflowobject.bar" would be evaluated by the workflow interpreter to be the list "['a', 'b', 'c']", and "$dataflowobject.car.cdr" would be evaluated by the workflow interpreter to be the Boolean value of "true". In other examples, different notations may be defined.

In some embodiments, a state definition for a state of a workflow state machine may be defined to include a workflow definition language features for defining inputs to be used in a current state and the generation of an output data flow object to be passed to a next state.

In some embodiments, and as noted above, one or more input or output filters may be applied in state to incoming data flow objects or in defining an output data flow object to the state. In some implementations, a data filter, when applied to a data object, creates a new data object that may have more or fewer member values or changed member values. In other words, in some cases, a data filter does not, when applied, result in a data object with fewer member values. Instead, the data filter may be interpreted to be a rule that when applied to a data object, modifies member values of the data object, augments or creates new member values in the data object, and/or removes member values, paths, or fields altogether from the data object.

For example, a state definition may include a "filter" field, where the value of the "filter" field may be an object with optional fields, in this example, those optional fields may be "input" and "output", as depicted in the workflow "Adder2" of TABLE 6, which depicts a state machine of one state, an initial state. TABLE 6.

TABLE 6

```
{
    "Adder2": {
        "filter": {
            "input": "$dataflowobject.numbers",
            "output": "$dataflowobject.sum"
        }
        "type": "task",
        "resource": "<resource_pathname>:Add",
        "start" = true,
        "end" = true
    }
}
```

In this example, the "Adder2" workflow may be launched with an input data flow object with two member values, "title" and "numbers", as depicted in TABLE 7.

TABLE 7

```
{
    "title": "List of numbers to add",
    "numbers": [3, 4]
}
```

Continuing with this example, when the workflow interpreter evaluates the initial state, the input data object available is the input data flow object of TABLE 7 as filtered according to the "input" data filter, which specifies that only the member "numbers" of the "dataflowobject" is to be available to any tasks within the state. In this example, no declarative statements, instructions, or tasks would have access to any members of the incoming data flow object except for the "$dataflowobject.numbers" member as specified by the "input" data filter. In other words, within the state in this example, "$dataflowobject.title" would not be visible or modifiable. In other cases, different input data filters may be applied to filter out any one or more member values or to not filter out any member values of the incoming data flow object.

Further in this example, and according to the output data filter, depicted in TABLE 6, when applied to the data flow object passed in to the initial state, would add a member to the input data flow object. In this example, a resulting output data flow object, after application of the output data filter is depicted in TABLE 8.

TABLE 8

```
{
    "title": "List of numbers to add",
    "numbers": [3, 4],
    "sum": 7
}
```

In different embodiments, the syntax or notation for specifying an output data filter rule or meaning may include syntax for replacing individual member values of an input data flow object, modifying member values of the input data flow object, including new member values, or defining an entirely new data flow object.

In some embodiments, a state definition for a state of a workflow state machine may be defined to include a workflow definition language features for handling error conditions.

For example, any state may encounter an error or error conditions during evaluation by the workflow interpreter. In some embodiments, to handle error conditions, a state may include a specification that a particular step or task be retried, or to transfer control to a catch state or function. In some cases, if an error persists through retries or is not caught, the workflow may terminate and indicate a failure.

In some embodiments, a retry option may be specified within a state definition using a "retry" field, as depicted in the example state definition of TABLE 9. Also depicted in TABLE 9 is an example of a state of type "fail", which may serve as a terminal state for the workflow, and which may provide a reason as to why the workflow failed. The "fail" state, in this example named "FailState" may be reached from any state in the workflow state machine, and a failure reason provided to a user may be the value of the "reason" field.

TABLE 9

```
"SomeState": {
    ...
    "retry": {
        "errors": ["WorkflowExecutionTimedOut"],
        "retry_interval": 1000,
        "backoff_coefficient": 2.0,
        "max_retry_interval": 0,
        "max_attempts": 3
    }
},
"SomeOtherState": {
    "type": "task",
    "resource": "<resource_pathname>:NeverEndingTask",
    "heartbeat": 30000,
    "timeout": 60000,
    "catch": {
        "CatchState": ["TaskTimeout"]
    }
},
"CatchState": {
    "type": task,
    "resource": "<resource_pathname>:CleanupWorkflow"
},
"FailState": {
    "type": "fail",
    "reason": "Workflow failure: $dataflowobject.error"
}
```

In this example, state definition "SomeState" may define a "retry" field with multiple parameters, and where a task called from within the state may be retried if the task encounters an error condition. Further in this example, the parameters of the "retry" field define how a given error condition is handled and define behavior for retrying a failed task.

In this example, the "retry" field may include an "errors" field whose values are an array, where members of the array may include strings for different error conditions. In some cases, a particular string name, for example, "Error", may be reserved to match with all error conditions. Otherwise, in this example, a retry may be attempted if the error condition matches an error condition in the "errors" field array of error conditions. In this example, a retry may be attempted if the error condition is a "WorkflowExecutionTimedOut" error condition.

Further in this example, the workflow interpreter may retry steps or tasks in the state definition according to different types of backoff formulas, for example, an exponential backoff formula. In the example state definition "SomeState", the "retry" field may include a "backoff_coefficient" field that may be used in defining a backoff coefficient to an exponential backoff formula. Continuing this example, a first retry may start after waiting "retry_interval" milliseconds, in this example, 1000 milliseconds. In this example, if a failure persists, then a backoff value for waiting is multiplied by "backoff_coefficient" until a "max_retry_interval" value is reached. In this example, retry attempts may repeat "max_attempts" number of times, or until the step or task in the state definition succeeds.

Further in this example, if retry attempts continue to fail after the specified maximum number of attempts, then the workflow interpreter may abandon retrying and proceed as if there were no specification for attempting retries, in which case, a "catch" field may identify a state or function to be called to handle the error condition. In some embodiments, any state definition may be defined to include "catch" fields. In some cases, where a state has both "retry" and "catch" fields, the workflow interpreter may first attempt to execute the retry operation, step, or task, and may proceed according to a "catch" field if the retries fail.

In some embodiments, and as depicted in TABLE 9, a default timeout value may be defined such that if tasks do not complete within the timeout value, the task may be considered to be timed out and fail. In some cases, timeout values may be defined within a "timeout" field of a state definition, and in such a case, the default timeout value is replaced by the defined timeout value. In this example, the "SomeOtherState" state specifies a "timeout" field value to be, say, 60000, which may be measured in milliseconds, or some other unit of time. Further in this example, if the task "NeverEndingTask" fails to complete within the timeout value, then the workflow interpreter transitions to the specified "CatchState" and proceeds to call the "Cleanup Workflow" task.

In some embodiments, a heartbeat value may also be defined within a "heartbeat" field of a state definition. For example, some tasks may be long running tasks that may run for hours, days, or months. Further, these long running tasks may execute on remote platforms, and it may therefore be difficult to obtain status information for these long running tasks. In such cases, a task may be defined to provide a heartbeat message to the caller, where the task sends heartbeat messages so long as the task is alive and progressing, and where if a heartbeat message is not received by the caller before the heartbeat value times out, the caller may determine that the task has become stuck or has otherwise failed. Further, both a "timeout" and a "heartbeat" field may be defined within a state definition.

In some embodiments, a state definition for a state of a workflow state machine may be defined to include a workflow definition language features for defining different types of states.

In some embodiments, a state definition may be defined to be different types. For example, a state definition may be defined to be, as described above in TABLE 1, a task type, which indicates that the state definition includes a call to a task.

In other embodiments, a state definition may be defined to be a workflow task type, which indicates a reference to another workflow, as depicted in TABLE 10.

TABLE 10

```
"ChildWorkflowState": {
    "type": "task",
    "resource": "<resource_pathname>:ChildWorkflow",
    "transitions": "NextState"
}
```

In this example, when the workflow interpreter evaluates the state definition for "ChildWorkflowState", a child workflow "ChildWorkflow" may be launched at a computing resource specified by "<resource_pathname>". In this example, the "ChildWorkflowState" state may not be transitioned out of, or be completed until the child workflow "ChildWorkflow" terminates.

Further, if the workflow that includes the "ChildWorkflowState" state is terminated, then any child workflows, including "ChildWorkflow" may also be terminated. Similar to a task, a child workflow may fail, time out, or be terminated, in which case, the parent workflow—in this case the workflow including the "ChildWorkflowState" state—may receive an error, and the state from which the child workflow was called may handle the workflow error condition similar to how error conditions for a task are handled as described above with regard to TABLE 9.

In some embodiments, a state definition for a state of a workflow state machine may be defined to include a workflow definition language feature for implementing branching logic in a workflow.

In this example, a state definition may be define a "type" field to be of type "choice", as depicted in the "ChoiceState" state in the workflow definition snippet of TABLE 11.

TABLE 11

```
"ChoiceState": {
  "type": "choice",
  "condition": "$dataflowobject.foo",
  "transitions": {
    "FirstMatchState": [1, 3, 4],
    "SecondMatchState": [2, 5, 6]
  }
  "default": "DefaultState"
},
"FirstMatchState": {
  "type": "task",
  "resource": "<resource_pathname>:OnFirstMatch",
  "transitions": "NextState"
},
"SecondMatchState": {
  "type": "task",
  "resource": "<resource_pathname>:OnSecondMatch",
  "transitions": "NextState"
},
"DefaultState": {
  "type": "fail",
  "reason": "No match in ChoiceState."
},
...
```

In this example, the "ChoiceState" is defined to be of a type "choice", and a conditional branch is dependent upon the value of the "foo" member of the input data flow object, "dataflowobject". In this example, the value of the "foo" member is referenced by "$dataflowobject.foo", and the value of "foo" is used to determine one of the branches in the "transitions" field—where either the "FirstMatchState" state is transitioned to if "$dataflowobject.foo" is one of [1, 3, 4], or the "SecondMatchState" state is transitioned to if "$dataflowobject.foo" is one of [2, 5, 6]. In this example, if the value of "$dataflowobject.foo" does not match either of the branch options in the "transitions" filed, then the "DefaultState" state is determined to be the transition state from the "ChoiceState".

Continuing with this example, if the input data flow object to "ChoiceState" is "{'foo': 2}", then "$dataflowobject.foo" is 2, and the "SecondMatchState" branch is determined to match, and the transition state is determined to be "SecondMatchState" and not the "FirstMatchState". In other words, in this example, a single transition state is matched from the "transitions" field.

Further in this example, after either the "FirstMatchState" or the "SecondMatchState" is transitioned to, the next state is "NextState" since both the "FirstMatchState" and the "SecondMatchState" transition to the "NextState" state.

In some embodiments, a state definition for a state of a workflow state machine may be defined to include a workflow definition language feature for implementing a wait state in a workflow.

For example, if a state is defined to be of type "wait", then the workflow processing is delayed for a specified amount of time, as depicted in the "WaitTenSeconds" state in TABLE 12.

TABLE 12

```
"WaitTenSeconds": {
  "type": "wait",
  "time": 10000,
  "transitions": "NextState"
}
```

In this example, the duration of the wait or delay is defined to be 10000 milliseconds, or 10 seconds as specified by the "time" field, and after the 10 seconds have passed, a transition is made to the "NextState" state as defined by the "transitions" field.

In some embodiments, a "wait" type state may be defined to wait until an absolute time, for example, Mar. 14, 2016 at 1:59 PM UTC, as depicted by the "WaitUntil" state in TABLE 13.

TABLE 13

```
"WaitUntil": {
  "type": "wait",
  "until": "2016-03-14T01:59:00Z",
  "transitions": "NextState"
}
```

In this example, as specified by the "until" field, the "WaitState" waits until Mar. 14, 2016 at 1:59 PM UTC, after which, a transition is made to the "NextState" state as defined by the "transitions" field.

In some embodiments, the "until" field of a "wait" type state may be defined to wait with respect to a variable, as depicted by the "WaitState" state in TABLE 14.

TABLE 14

```
"WaitUntil": {
  "type": "wait",
  "until": "$dataflowobject.expirationdate",
  "transitions": "NextState"
}
```

In this example, as specified by the "until" field, the "WaitState" waits until the value of "$dataflowobject.expirationdate", after which, a transition is made to the "NextState" state as defined by the "transitions" field. For example, if the "WaitUntil" state is called with an input data flow object of "{'expirationdate': '2016-03-14T01:59:00Z}", then the "WaitState" waits until Mar. 14, 2016 at 1:59 PM UTC, after which, a transition is made to the "NextState" state as defined by the "transitions" field.

In some embodiments, a state definition for a state of a workflow state machine may be defined to include a workflow definition language feature for implementing parallel execution of branches, or inline workflows.

For example, if a state is defined to be of type "parallel", then all of the branches of the "branches" field are executed. An example state, "LookupCustomerInfo" state of type "parallel" is depicted in TABLE 15.

TABLE 15

```
"LookupCustomerInfo": {
  "type": "parallel",
  "branches": [
    {"LookupAddress": {
      "type": "task",
      "resource":"<pathname>:LookupAddr",
      "start": true,
      "end": true
```

TABLE 15-continued

```
    }},
    {"LookupPhoneNumber": {
      "type": "task",
      "resource":"<pathname>:LookupPhoneNum",
      "start": true,
      "end": true
    }}],
  "filter": {
    "LookupAddress": {
      "output": "$dataflowobject.address"
    },
    "LookupPhoneNumber": {
      "output": "$dataflowobject.phone"
    }},
  "transitions": "NextState"
}
```

In this example, the "branches" field defines two branches, "LookupAddress" and "LookupPhoneNumber", where the tasks corresponding to these two branches, "LookupAddr" and "LookupPhoneNum", are executed in parallel. In this example, each branch of the "branches" field may be an object included within a list of objects, and where each object—similar to a workflow start state definition—includes a "start" state and at least one or more "end" states.

Further in this example, the workflow interpreter provides each branch's start state a copy of the input data flow object received by the "parallel" type state specifying the branch. In this example, once parallel execution of the branches has begun, processing of the state waits until each of the branches has terminated execution by reaching an end state.

Continuing this example, the "filter" field specifies an output data filter to be applied to the input data flow object, where the "filter" field includes a filter corresponding to the output of each of the branches. In this case, the "LookupAddress" filter matches up to the output for the "LookupAddress" branch, and when the "LookupAddress" branch terminates, the application of the "LookupAddress" filter results in updating the input flow object, "dataflowobject", with an "address" member that is set to the output of the "LookupAddress" branch. In other words, if the "dataflowobject" has a previous value for an "address" member, that value is replaced by the output of the "LookupAddress" branch, and if there was no "phone" member, the "dataflowobject" is updated to include a "phone" member with a value set to the output of the "LookupAddress" branch.

Similarly, in this example, the "LookupPhoneNumber" filter matches up to the output for the "LookupPhoneNumber" branch, and when the "LookupPhoneNumber" branch terminates, the application of the "LookupPhoneNumber" filter results in updating the input flow object, "dataflowobject", with an "phone" member that is set to the output of the "LookupPhoneNumber" branch. In other words, if the "dataflowobject" has a previous value for a "phone" member, that value is replaced by the output of the "LookupPhoneNumber" branch, and if there was no "phone" member, the "dataflowobject" is updated to include a "phone" member with a value set to the output of the "LookupPhoneNumber" branch.

As an example, if the input data flow object were defined as depicted in TABLE 16, then the output data flow object, after application of the output data filters may be as depicted in TABLE 17.

TABLE 16

```
{
  "address": "UNKNOWN",
  "phone": "512-555-1001",
  "email": "somebodysomewhere@genericdomain.com"
}
```

TABLE 17

```
{
  "address": {
    "name": "Stevie Ray Vaughn"
    "street": "1234 Congress Avenue",
    "city": "Austin",
    "state_or_province": "Texas",
    "country": "USA",
    "zip": 78704
  }
  "phone": "512-555-7777",
  "email": "somebodysomewhere@genericdomain.com"
}
```

In some cases, the filters in a "filter" field may not include a filter to match every one of the branches.

In this example, when all branches have terminated, the state may stop waiting and trigger the "transitions" field to transition to the next state, "NextState". Further, at the point that all branches have terminated, the output data filter may have completed any applications of filters to the input data flow object to generate an output data flow object that is passed to the next state, "NextState".

In some embodiments, as depicted in TABLE 18, output for a state, including output for a parallel state, may not apply any output data filters and may instead echo the input data flow object as the output data flow object—regardless of the output of any parallel branches.

TABLE 18

```
"ParallelMath": {
  "type": "parallel",
  "branches": [
    {"Add": {
      "type": "task",
      "resource":"<pathname>:Addition",
      "start": true,
      "end": true
    }},
    {"Subtract": {
      "type": "task",
      "resource":"<pathname>:Subtraction",
      "start": true,
      "end": true
    }}
  ],
  "transitions": "NextState"
}
```

In this example, if the "ParallelMath" state is provided with an input data flow object equal to "[3, 2]", then the "Add" state and branch would be provided with an input data flow object equal to "[3, 2]" and produce an output of 5. Similarly, the "Subtract" state and branch would be provided with an input data flow object equal to "[3, 2]" and produce an output of 1.

However, in contrast to the application of the output data filters in TABLE 18, in this example, no output data filters are applied to the input data flow object, and therefore, in this case, the input data flow object is passed unmodified as the output data flow object to the "ParallelMath" state and provided as the input data flow object to the "NextState". In other words, the "NextState" is called with an input data flow object equal to "[3, 2]".

In some embodiments, a state definition for a state of a workflow state machine may be defined to include a workflow definition language feature for implementing parallel execution of branches, or inline workflows, where a same task is applied to multiple inputs. In this example, such a parallel feature is provided by specifying a state as a type "map". The map feature is in contrast to the "parallel" type where different parallel branches specify their own respective states or inline workflows.

In this example, a state, "DNSlookup", is defined to be of type "map" as depicted in TABLE 19.

TABLE 19

```
"DNSlookup": {
   "type": "map",
   "map_states": {
      "NSlookup": {
         "type": "task",
         "resource": "<resource_pathname>:Lookup",
         "start": true,
         "end": true
      }
   },
   "filter": {
      "input": "$dataflowobject.websites",
      "output": "$dataflowobject.IPaddresses"
   },
   "transitions": "NextState"
}
```

In this example, a DNS (domain name service) IP (Internet protocol) lookup may be performed on a list of IP addresses—where the list of IP addresses is defined by applying the input data filter to the input data flow object, "dataflowobject".

Further, for each respective element of the input list, a map task is created for that respective element, and where the instance of the created map task uses that respective element as input. In this example, if "$dataflowobject.websites" were equal to "['www.amazon.com', 'nytimes.com']", then a first map task of "Lookup", as specified by the "resource" field, is created with an input of "www.amazon.com", and a second map task of "Lookup" is created with an input value of "nytimes.com". Each of the map task created may operate in parallel. In some cases, each element of the list may be of a different data type, and the same task may be defined to handle multiple different data types. More generally, the list may be an array, a set, or any data structure with multiple elements that may be indexed.

Finally in this example, the output data filter specified by the "filter" field sets the "IPaddresses" member field of the "dataflowobject" to be a list of outputs corresponding to respective outputs of the respective map tasks operating on respective list elements of the "$dataflowobject.websites" input list. In this example, the input data flow object is depicted in TABLE 20, and the output data flow object is depicted in TABLE 21. Further in this example, the input data flow object does not include a member field for "IPaddresses" and the application of the output data filter creates the member field for "IPaddresses".

TABLE 20

```
{
   "websites": ["www.amazon.com", "nytimes.com"]
}
```

TABLE 21

```
{
   "websites": ["www.amazon.com", "nytimes.com"]
   "IPaddresses": [205.251.242.103, 206.190.36.45]
}
```

FIG. 1A illustrates an embodiment of a workflow interpreter 120, which may be implemented within a variety of computing device contexts, including, for example, within a workflow interpreter service implemented within a provider network, or within a client computing device executing locally within a client network.

For example, the workflow interpreter 120 may be part of a workflow interpreter service 102, which may be installed on a client system as part of a developer kit for building and specifying workflows through the specification of workflow definitions. In this example, a user may specify a workflow definition through the workflow definition language described above.

In another example the workflow interpreter service 102 may be implemented within a provider network that a client may access remotely through a network. In some cases, multiple different clients, through one or more respective client computing devices may access interface 104 of the workflow interpreter service through a network. In some implementations, interface 104 to the workflow service may provide an application programming interface through which a workflow definition application executing on a client computing device may communicate to define, register, and launch workflows. In other examples, interface 104 may host a workflow definition application that may be accessible to a client on a client computing device, for example, through a website.

In this example, when a workflow is registered and launched, the workflow interpreter service 102 may store the workflow definition for the workflow in workflow definition storage 124. In some cases, workflow interpreter service may process multiple different workflows in parallel, and in such a case, each respective workflow's definition may be stored among workflow definitions 122. In this example, an example workflow definition being retrieved or stored is depicted by workflow definition 123.

Further in this example, on launch of a workflow, workflow interpreter 120 may be called with an initial data flow object, data flow object 106, where data flow object 106 is provided with start workflow request 108. Further, as depicted at 107, an output data flow object generated as a result of executing the workflow may be provided to a user through the interface. As the workflow interpreter 120 processes the workflow and transitions in between states of the workflow state machine, the workflow interpreter 120 may send task indications 110 to the interface 104 so that the tasks corresponding to the task indications 110 are called at a corresponding resource location. For example, one or more services on different remote hosts may provide computing resources for providing task execution services. As tasks complete, task results 112 may be provided to the workflow interpreter 120.

Given task results from tasks executed for a given state of the workflow state machine, the workflow interpreter 120 may transition to different states. Further in this example, the workflow interpreter 120 may store input and output data flow objects for each state of the workflow state machine within a workflow data storage such as workflow log data storage 120. In this example, workflow data log storage 120 stores multiple different workflow data logs 126 for multiple, respective workflows.

As discussed above, the workflow interpreter 120 may store an instance of the input data flow object and the output data flow object for each state of the workflow state machine as each state is transitioned into and out of during the processing of the workflow. In this example, a sample data flow object being stored or retrieved is depicted by data flow object 127.

Further depicted within the workflow interpreter service 102 is a module corresponding to a workflow visualization service, workflow visualization service 116. In some embodiments, workflow visualization service 116 may receive update information with regard to the overall structure of a state machine for a workflow, receive current state information, receive data flow object definitions upon entering and exiting the current state, receive the status of timeout or heartbeat values for a currently executing task, among others. In this way, the workflow visualization service may generate a visual representation of the workflow state machine with informative information overlaid upon different visual elements of the states of the state machine, and where this visual representation of the workflow state machine is updated as the workflow is processed.

Further depicted within the workflow interpreter service 102 is a module corresponding to a heartbeat monitor, heartbeat monitor 118. In this example, heartbeat monitor may be an execution thread that executes to handle heartbeat messages from tasks implementing heartbeats. In some embodiments, the handling of both heartbeats and timeouts is described with regard to FIG. 6.

Further depicted in provider network 126 are services that may be used by the workflow interpreter service 102, including an event-based computing service 132, a virtual computing service 130, and a database service 128.

Figure 1B:
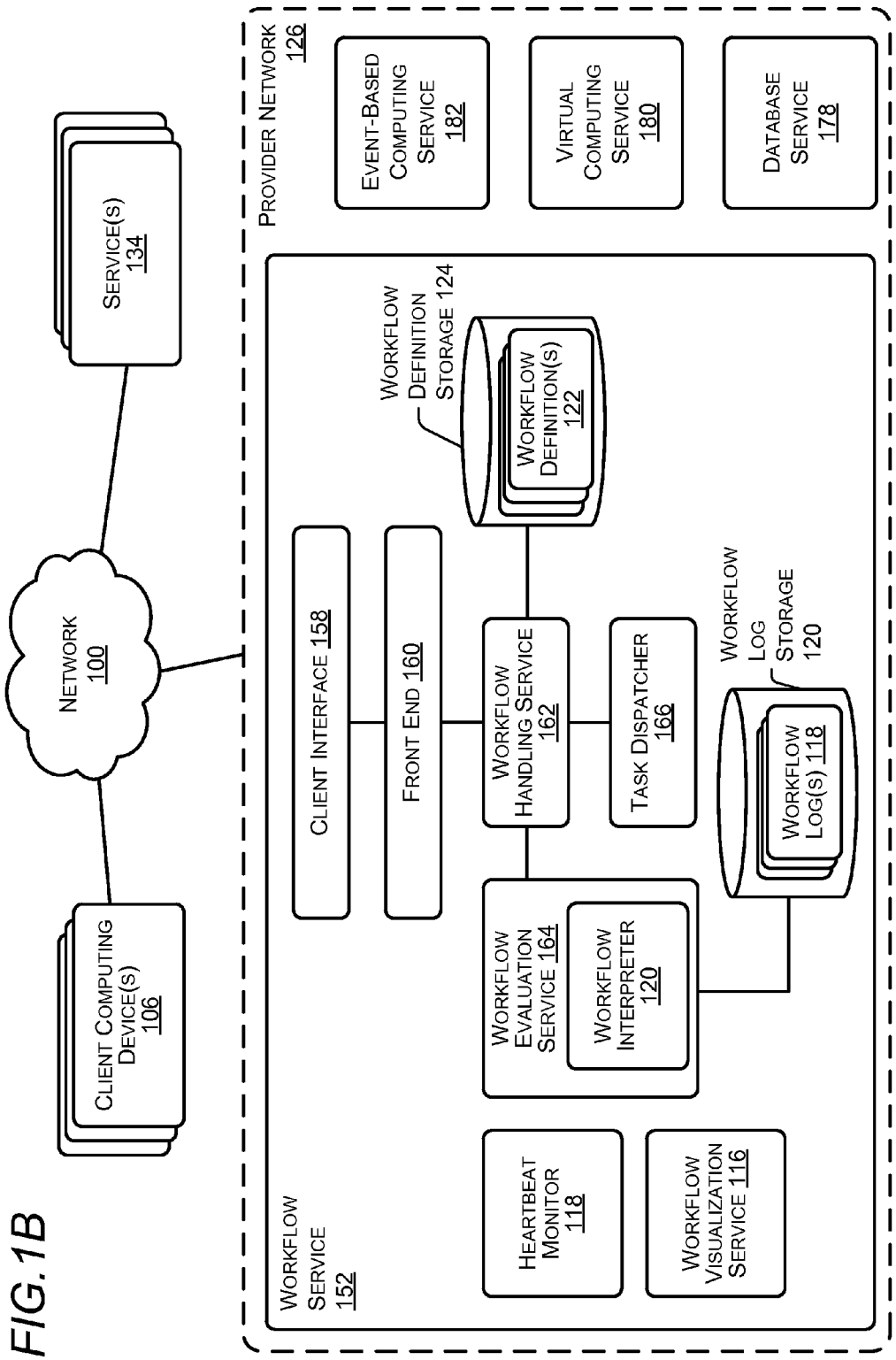
FIG. 1B is an illustrative architecture depicting an example workflow service within a provider network according to some implementations.

FIG. 1B illustrates an implementation of the workflow interpreter 102 within the context of a workflow service 152. As an example, a workflow service may provide a client interface and a front end, where the client interface provides a platform for the creation and registration of a workflow definition for a workflow. Further, in some cases, the front end may validate a workflow definition, and if the workflow definition is valid, then the front end may provide the workflow definition to a workflow handling service to begin executing the workflow. In some cases, the workflow definition may be defined as a state machine, where given states of the state machine specify one or more tasks to be performed for the state, and a transition to other states of the state machine. In this way, as progress is made through different states of the state machine, different tasks corresponding to the workflow are executed. Further, one workflow definition may be used to create any number of workflow threads. For example, if the workflow definition is for a workflow for processing online orders for items to be fulfilled, then the same workflow definition may be used in creating a workflow for each given item ordered.

Continuing with this example, the workflow handling service may begin execution of the workflow corresponding to the workflow definition. For example, the workflow handling service may receive an indication from the front end to begin execution of the workflow, and in response, the workflow handling service may make a request to a workflow evaluation service to determine a next task to schedule for the workflow. Requests from the workflow handling service to the workflow evaluation service may be non-blocking, which allows the workflow handling service to continue to receive indications to advance other workflows without waiting for the response from the workflow evaluation service. Further, the requests may include a log of completed tasks related to the workflow. As noted above, a single workflow definition may correspond to multiple, different workflows, and in such cases, the workflow handling service may maintain a respective workflow log for each respective workflow.

In this example, the workflow evaluation service, for each given request from the workflow handling service for a decision corresponding to a given workflow, may create a workflow evaluation thread to determine the decision and continue to receive requests for decisions for other workflows as each workflow evaluation thread executes. Further, in some cases, different workflow evaluation threads may execute on different computing hosts of a provider network, or within different instantiated computing resources of a given computing host of the provider network. In different embodiments, a workflow evaluation thread may generally be considered a sequence or collection of program instructions whose execution may progress concurrently, in parallel, or in an interleaved manner with other workflow evaluation threads. In some embodiments, a workflow evaluation thread may be spawned, created, or allocated by a parent process or thread, such as the workflow evaluation service. In other embodiments, a workflow evaluation thread may be a worker thread in a thread pool managed by a thread service.

Continuing with this example, for the workflow being initiated, the workflow evaluation thread, created by the workflow handling service in response to receiving the request for a decision, may construct a state machine for the workflow and determine a current state of the state machine. In this example, after evaluation the current state, the workflow evaluation thread may determine a next workflow decision and provide the workflow decision to the workflow handling service so that the workflow handling service may determine a corresponding task for the workflow decision and schedule the task for execution.

Further, the workflow handling service may log or record the workflow decision so that a subsequent workflow evaluation thread may determine a current state for the state machine corresponding to the workflow in order to determine a next workflow decision.

In this example, after the workflow evaluation thread completes, the workflow evaluation thread may terminate and any computing resources that were allocated for performing the workflow evaluation thread may be unallocated, or freed, for use. In this example, because each workflow evaluation thread terminates upon determining a workflow decision, a subsequent workflow evaluation thread—in order to determine a current state for the same workflow—uses the workflow log for a workflow to determine a current state of the state machine for the workflow.

In this way, for any given workflow, because a given workflow evaluation thread is provided with information for determining a current state of a workflow, a workflow evaluation thread does not need to persist in order to determine a current state of a workflow. Thereby preventing idle allocation of computing resources in providing continuous workflow execution.

FIG. 1B further illustrates an example computing environment that includes an example embodiment of workflow service, workflow service 152. In this example, the workflow service is implemented within provider network 176. In this example, one or more clients, through one or more respective client computing devices 106 may access client interface 158 of the workflow service using network 100.

As discussed above, a client interface may provide a platform for the specification of a workflow definition. In some examples, the workflow specification may be specified in a development environment providing tools for using a programming language with domain specific language features for defining workflows. In some embodiments, such a domain specific language may include language features for specifying workflow states, workflow tasks, including serial or parallel tasks, workflow state transitions, and workflow error handling, among other features. In some examples, the development environment may also include tools for specifying some or all features of a workflow using graphical tools.

In some examples, the client interface may be provided through a website. In other cases, the client interface may provide an application programming interface for interfacing with a client-side application such as a development kit installation.

As depicted, the client interface may communicate with front end 160 of the workflow service, where the front end may validate the workflow definition and then register the workflow or indicate to the client computing device that a workflow definition failed to validate. While front end 160 and client interface 158 are depicted as separate for the purposes of clarity, the logical functionality of front end 160 and client interface 158 may be combined in different embodiments.

As depicted, workflow service 152 may also include workflow handling service 162, workflow evaluation service 164, and job dispatcher 166. In some embodiments, the logical functionality of a job dispatcher may be included within a workflow handling service instead of being a separate component of the workflow service. As discussed above, workflow handling service 162 may receive indications to either begin a workflow or to advance a workflow. For example, when a workflow is initially validated, the front end may indicate to the workflow handling service to begin execution of the workflow. In other cases, the workflow may have already been started, and the front end may provide to the workflow handling service an indication that a task corresponding to a given workflow has completed, and consequently, that a decision is to be made with regard to a next task to execute for the workflow.

As discussed above, to advance execution of a workflow, the workflow handling service may request a decision to be made for the workflow, where the decision is requested from the workflow evaluation service. Further, in some cases, the request from the workflow handling service may specify a workflow and a corresponding workflow log, where the workflow log may include previous events, completed tasks, or other information related to the workflow. As depicted, workflow logs 118 may be stored in workflow log storage 120.

In some cases, in response to a request from the workflow handling service for a decision for the workflow, the workflow evaluation service may access a workflow definition for the workflow. As depicted, workflow definitions 122 may be stored in workflow definition storage 124.

Further in this implementation, the workflow service may be one of multiple different services provided within a provider network, such as provider network 126. As depicted, other services may include database service 178, virtual computing service 180, and event-based computing service 182, among others. Further, in some embodiments, a database service, such as database service 178, may provide the storage services provided by workflow definition storage 124 and/or workflow log storage 120. More generally, any of the storage services used by the workflow service may be provided by either local storage, a storage service, or a combination of local storage and storage services.

In some embodiments, a workflow may be specified to use services provided entirely within provider network 126. However, in other examples, a workflow may be specified to use one or more services provided from a third party, for example, services 134. In some cases, a combination of provider network services and third party services may be used in the execution of a given workflow.

In this way, beginning with a client system specifying a workflow, a workflow service may begin executing the workflow in a manner that provides continuous workflow processing using multiple, discrete deployments of computation resources in a manner that avoids idle allocations of computing resources. Further, given that a given workflow may be serviced by a new processing thread each time the workflow is to be advanced, distribution of the computation for the processing threads may be spread across different computing hosts of the provider network to avoid computational bottlenecks and to allow for efficient scaling of the servicing of multiple different workflows.

FIG. 2 illustrates workflow launch flowchart 200 depicting example operations performed in processing a workflow with the workflow interpreter according to some implementations.

A launch of a workflow may begin after a workflow has been received from a client and the workflow definition has been validated. At this point, the workflow interpreter service may launch a workflow, as depicted at 202, and load the workflow, as depicted at 204, and provide the workflow interpreter with the workflow definition and an initial data flow object.

In this example, the workflow interpreter may identify the start state, as depicted at 206, of the workflow state machine as defined in the workflow definition. For example, the workflow interpreter may identify a state definition that includes a "start" field set to "true", as described above with regard to TABLE 1.

In this example, with the start state identified, the workflow interpreter may begin evaluating the workflow definition language instructions for the current state, as depicted at 208, which in this case, the current state is the start state. In this example, the evaluation of the current state may include determining the input data flow object, as depicted at 208A, applying an input filter to the input data flow object to determine elements of the input data flow object to be processed within the state and generate input data for the state, as depicted at 208B, passing the input data for the state to any state processing logic, as depicted at 208C and 210, and applying an output filter to any output of the state processing logic and/or the received input data flow object, as depicted at 208D, to generate an output data flow object.

In some examples, the state processing logic 210 may include a call to a task, or may be some other operation. Further, in some examples, there may be no input filter and/or no output filter to apply—and in such cases, the input data flow object may be echoed as an output data flow object.

Continuing with this example, after the output data flow object has been generated, the workflow interpreter may determine whether the current state is an end state, as depicted at 212. If the current state is an end state, the output data flow object is provided as a workflow results, as depicted at 214. Otherwise, if the current state is not an end state, then the workflow interpreter may evaluate a transition field of the current state to determine a next state, and provide the output data flow object from the current state as an input data flow object to the next state, as depicted at 216.

In this way, the workflow interpreter may transition through each of the states of a workflow state machine, and in so doing, process the workflow according to a workflow definition.

Figure 3:
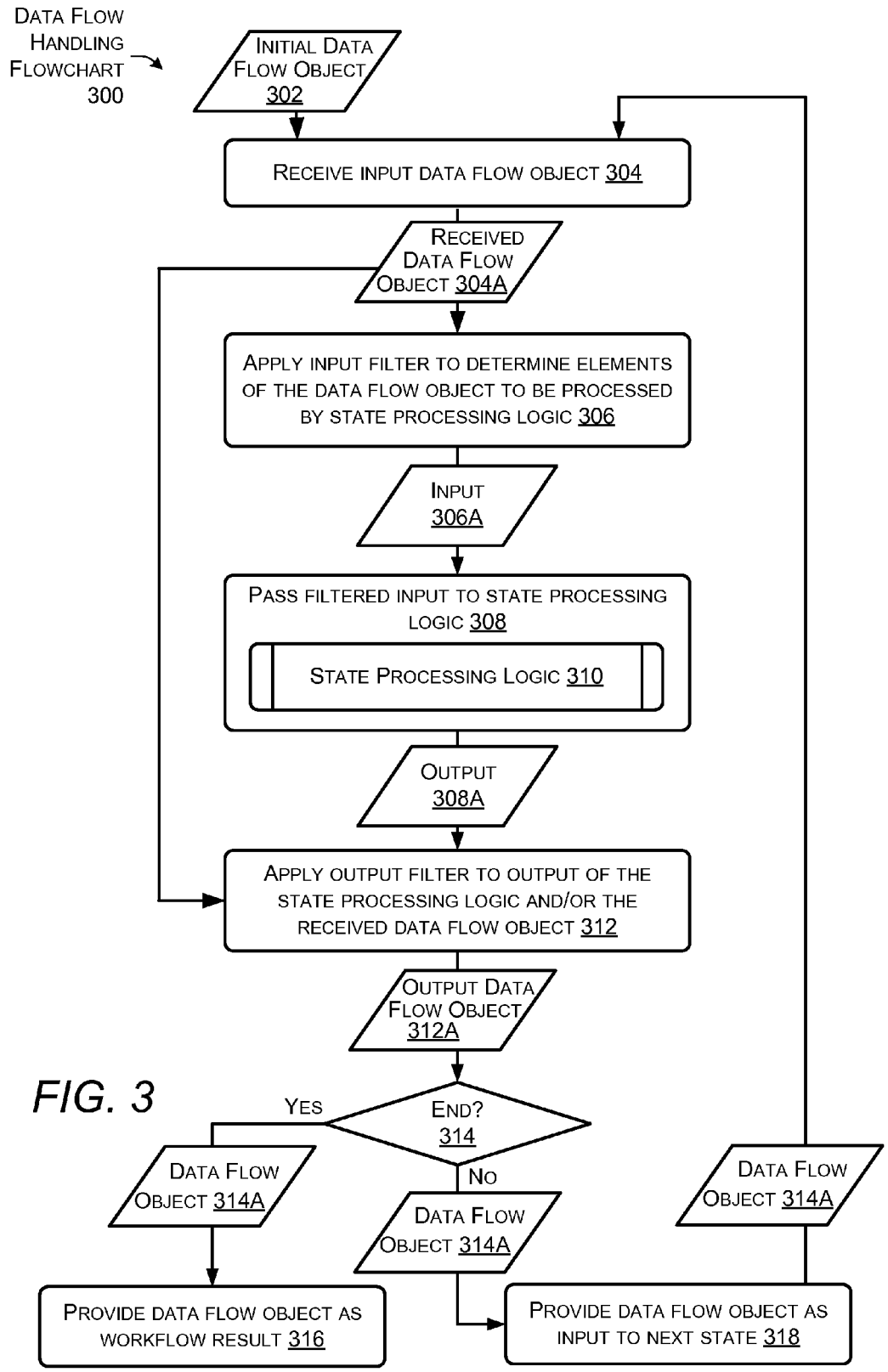
FIG. 3 illustrates a data flow handling flowchart that depicts a closer view of the data flow handling as the workflow interpreter processes a given state of a workflow state machine according to some implementations.

FIG. 3 illustrates a data flow handling flowchart 300 that depicts a closer view of the data flow handling as the workflow interpreter processes a given state of a workflow state machine.

As described above with regard to FIG. 2, a workflow interpreter may begin executing a workflow by identifying an initial state for the workflow and identifying an initial data flow object. Further, as described above with regard to TABLE 6, a workflow may be a single state, and this example workflow is used as a reference for data flow handling flowchart 300.

As depicted in TABLE 6, an initial state may be the "Adder2" state, and an initial data flow object, as depicted at 302, may be an input data flow object equal to "{'title': 'List of numbers to add', 'numbers': [3, 4]}". This initial input data flow object may be received, as depicted at 304, and this input flow data object, depicted as received flow object 304A, may be used as a target for applying a data filter to determine elements of the input flow object to be processed by the state processing logic, as depicted at 306. The filtered input is depicted at 306A.

In this example, as depicted in TABLE 6, the input data filter selects on the numbers member field of the input flow object to be used, and the "title" member field is thereby not available for use within the state processing. Therefore, in this example, the filtered input may be "{'numbers': [3, 4]}".

In this example, as depicted in TABLE 6, the state processing logic, as depicted at 310, includes a call to an "Add" task, and the "Add" task may be called with the filtered input, as depicted at 308.

In this example, the output, as depicted by 308A, of the "Add" task may be received by the workflow interpreter, and the output data filter may be applied to the received output and/or the initial received data flow object, as depicted at 312. As depicted in TABLE 6, the output data filter sets the "sum" member field of the received data flow objet to be the output of the "Add" task. In this example, the resulting, output data flow object is thus "{'title': 'List of numbers to add', 'numbers': [3, 4], "sum": 7}".

At this point, the workflow interpreter may determine if the current state is an end state, as depicted at 314. As depicted in TABLE 6, the current state is an end state, and therefore the workflow interpreter would provide the output data flow object as the workflow result, as depicted at 316. Again, in this example, the output data flow object, as depicted at 314A, is "{'title': 'List of numbers to add', 'numbers': [3, 4], "sum": 7}".

Otherwise, if the current state were not an end state, then the workflow interpreter would determine a transition state and provide the output data flow object, depicted by 314A, to a next state, as depicted at 318.

In this way, the workflow interpreter may transition through each of the states of a workflow state machine, and in so doing, process the workflow according to a workflow definition.

Figure 4:
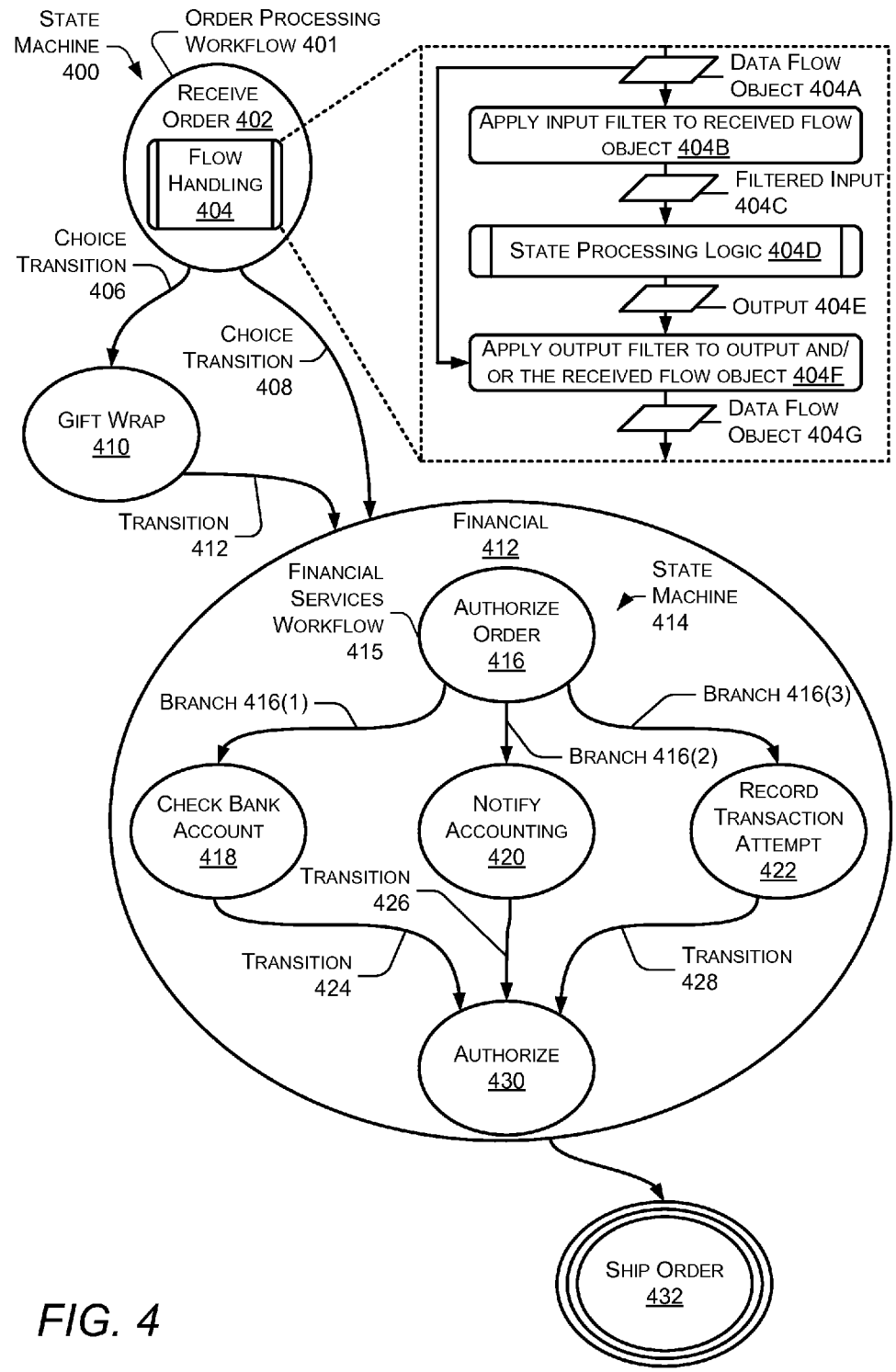
FIG. 4. illustrates a state machine for a workflow that includes an inline or child workflow corresponding to another state machine according to some implementations.

FIG. 4 illustrates a state machine 400 for a workflow that includes an inline or child workflow corresponding to state machine 414. In this example, state machine 400 corresponds to an order processing workflow 401 for processing an order for an item, and state machine 414 corresponds to a financial services workflow 415 for performing financial verification for a given order.

As described above with regard to FIG. 2, a workflow interpreter may begin executing a workflow by identifying an initial state for the workflow and identifying an initial data flow object. Further, as described above with regard to FIG. 3, the workflow interpreter may handle data flows in between states through the application of optional input and output filters applied upon entering and exiting a given state.

The initial state of state machine 400 is depicted as include a representation of a flow handling module, flow handling 404.

In this example, each of the states of state machine 400 and of state machine 414 include a similar flow handling module, which is described in detail with regard to FIG. 3, and which is provided at a higher level within flow handling 404 operations depicted by receiving a flow object (404A), applying an input filter to the received flow object (404B) to generate filtered input data (404C), providing the filtered input data to state processing logic (404D), receiving output (404E) from the state processing logic, and generating an output data flow object (404G) through the application of any output data filters to the output (404E) and/or the received flow object (404A).

As depicted by state machine 400, a receive order 402 state may be a "choice" type state, as described above with regard to TABLE 11. If the input data flow object indicates that the order is a gift, then the workflow interpreter transitions to gift wrap 410 state, as depicted by choice transition 406. Otherwise, in this example, if the input data flow object does not indicate that the order is a gift, then the workflow interpreter transitions to financial 412 state, as depicted by choice transition 408.

In this example, the financial 412 state may be reached through either the receive order 402 state or the gift wrap 410 state. Further in this example, the financial 412 state may include a call to an inline workflow or a child workflow, as depicted in TABLE 10. In this example, the inline workflow is depicted as financial services workflow 415.

In this example, the financial services workflow 415 is called from the financial 412 state, similar to how the "ChildWorkflowState" in TABLE 6 calls the "ChildWorkflow" workflow. In this example, processing of the financial 412 state is suspended until the financial services workflow 415 has terminated, either through success or through an error.

In this example, the workflow interpreter, or another instantiation of the workflow interpreter, possibly on other computing resources, may begin processing the financial services workflow 415. In processing state machine 414, the workflow interpreter may begin at the authorize order 416 state, which in this example, is a state of type "parallel", as described above with regard to TABLE 15.

In this example, from the authorize order 416 state, the workflow interpreter may determine that there are three tasks to schedule as part of the evaluation of the authorize order 416 state. These three tasks are depicted by branch 416(1) to check bank account 418, branch 416(2) to notify accounting 420, and branch 416(3) to record transaction attempt (422).

In this example, as each task completes, the output may be gathered and possibly filtered at authorize 430, as depicted by transitions 424, 426, and 428—where at authorize 430, an output data flow may be generated to serve as output for the financial services workflow 415. At this point, in this example, the workflow interpreter may transition from the financial 412 state to the final, ship order state 432.

In this way, a workflow service may process the order processing workflow corresponding to state machine 400, and correspondingly, fulfill an order for an item, where the order processing workflow makes use of inline financial services workflow to perform financial services operations. This modular use of inline workflows may also encourage code reuse and quicker development of future workflows that may depend on financial services operations performed by the financial services workflow 415.

Figure 5:
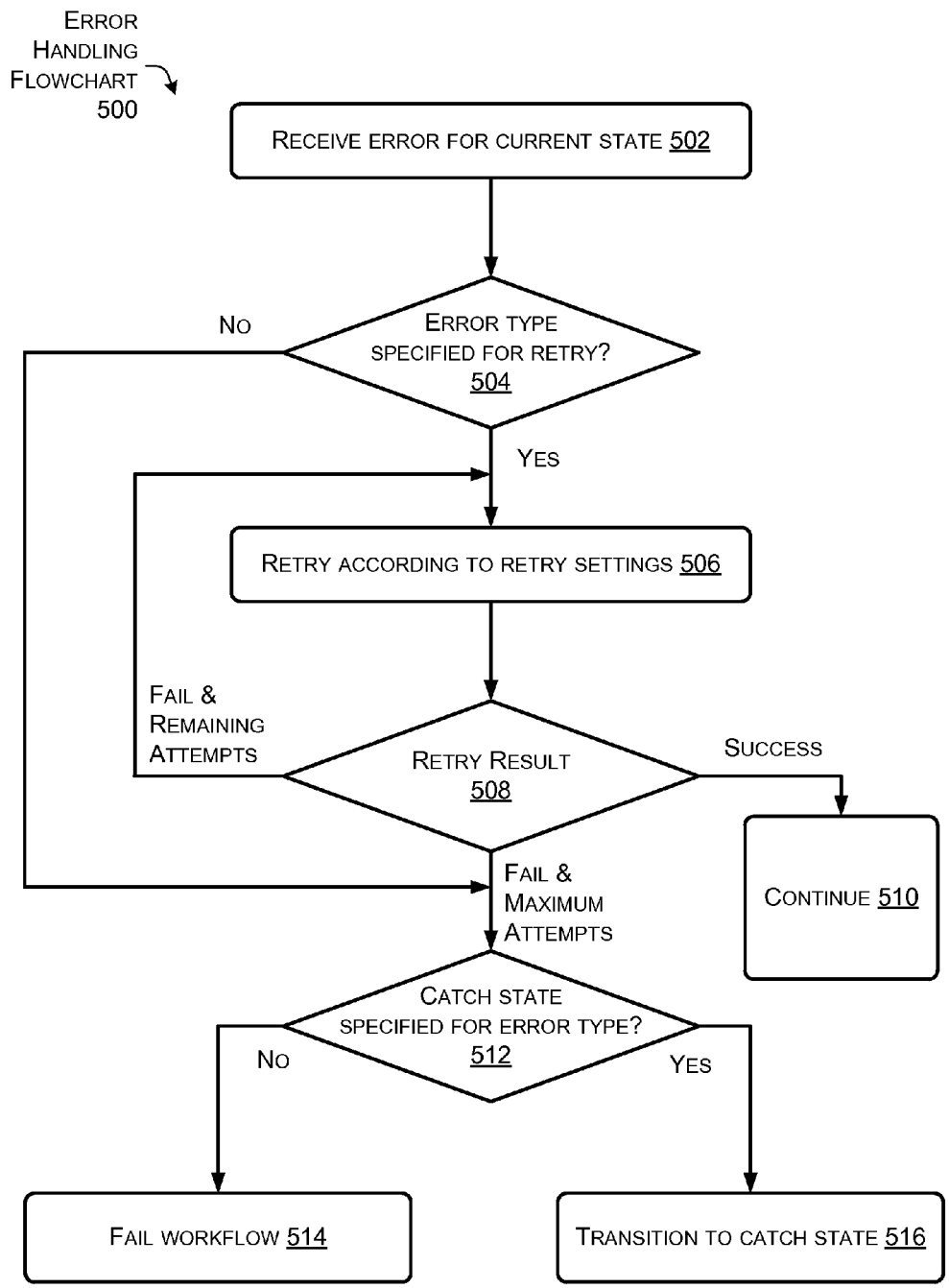
FIG. 5 illustrates error handling flowchart depicting example operations performed in handling error conditions by the workflow interpreter during an evaluation of a state definition of a workflow state machine according to some implementations.

FIG. 5 illustrates error handling flowchart 500 depicting example operations performed in handling error conditions by the workflow interpreter during an evaluation of a state definition of a workflow state machine.

As discussed above with regard to TABLE 9, any given state of a state machine may include a "retry" field for handling error conditions. In this example, the workflow interpreter may be evaluating a current state "SomeState" of TABLE 9 when an error condition is received, for example, from failed task. This receiving of the error for the current state is depicted at 502.

In this example, the workflow interpreter may determine whether the current state includes a "retry" field specifying that if an error condition of the type of error condition received is on for which a retry of the error producing task is specified, as depicted at 504. For example, if the "errors" member of the "retry" field includes an error condition in a list of error conditions matching the error condition received from the failed task.

In this example, if the error condition is matched, then a retry may be performed according to the settings in the "retry" field, as depicted at 506. Otherwise, the workflow interpreter may proceed to determine if a catch state is specified for the error type, as depicted at 512—where if a catch state is not specified, then the workflow fails, as depicted at 514, and where if the catch state is specified, then the workflow interpreter transitions to a defined catch state, as depicted at 516.

Returning to 506, the workflow interpreter may evaluate the "retry" field settings of the current state to retry a task. If the task fails again, then the retry result, as depicted at 508, is considered a failure and if there are attempts remaining, then the workflow interpreter proceeds to retry again by proceeding to 506. In this example, the maximum attempts for a retry are specified according to a "max_attempts" member of the "retry" field, as depicted in TABLE 9.

With further regard to 508, if the retry result is a success, then the workflow interpreter may continue, as depicted at 510. In some cases, there may be additional statements in the current state to evaluate, and in other cases, continuing to process the workflow may include transitioning to another state. Otherwise, if the maximum retry attempts have been done without any success from the task, then the workflow interpreter may proceed to determine of a catch state is specified, as depicted at 512.

As described above, at this point, if there is not catch state specified, the workflow fails, and if there is a catch state specified, then the workflow interpreter transitions to the catch state.

In this way, the workflow interpreter, through the specification of catch states and retry configurations, may handle different types of errors in a graceful manner, where a user may be provided with useful information as to why a workflow failed.

Figure 6:
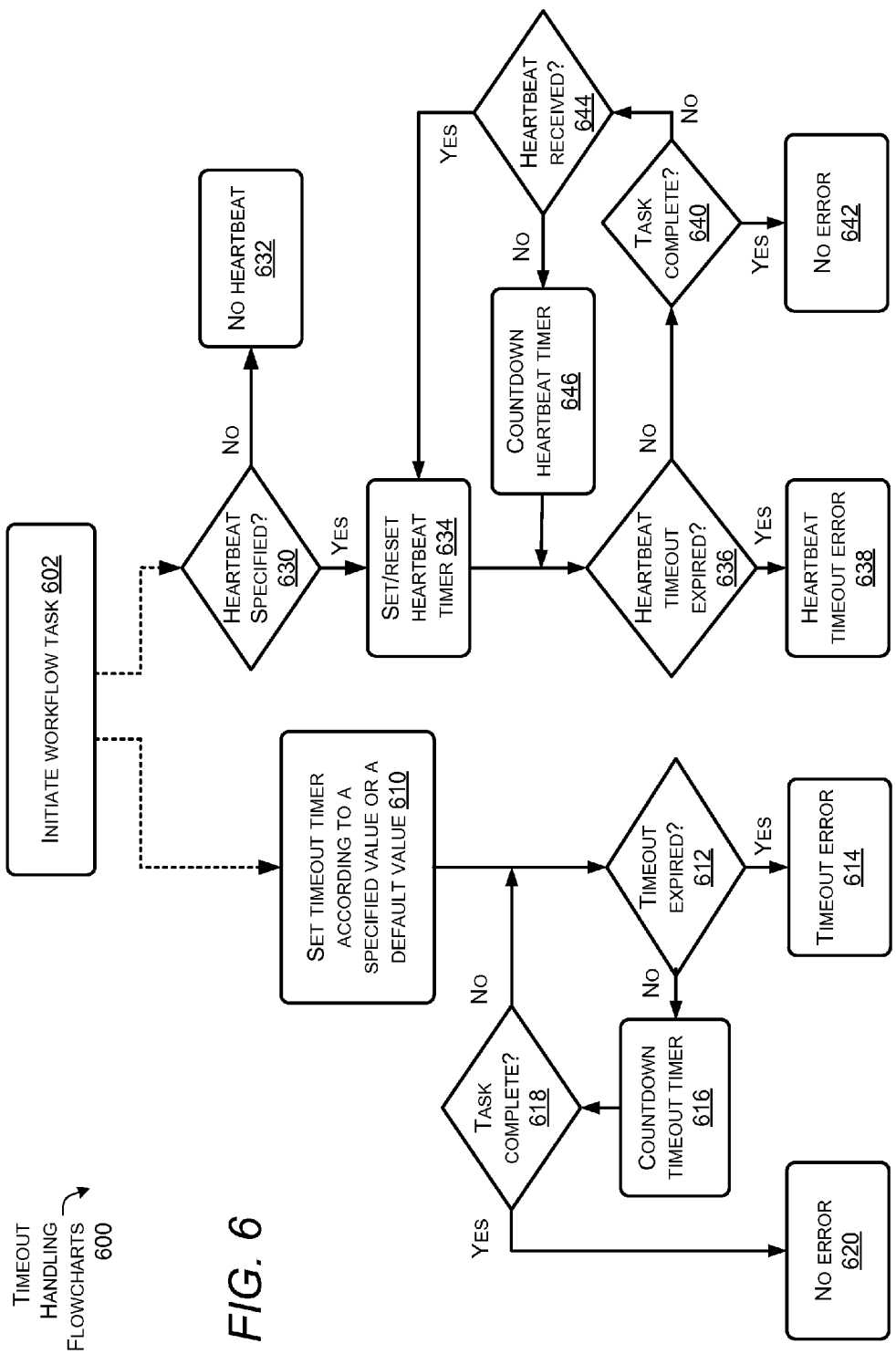
FIG. 6 illustrates timeout handling flowcharts for both timeouts and heartbeat timeouts, and depicts example operations performed in handling timeouts by the workflow interpreter during an evaluation of a state definition of a workflow state machine according to some implementations.

FIG. 6 illustrates timeout handling flowcharts for both timeouts and heartbeat timeouts, and depicts example operations performed in handling timeouts by the workflow interpreter during an evaluation of a state definition of a workflow state machine. In this example, as depicted at 602, the workflow interpreter may, in evaluating the state definition of the current state, initiate a task and proceed to wait for the task to complete.

Further in this example, both a timeout value and a heartbeat timeout value may be used in the same state. As discussed above with regard to TABLE 9, any given state of a state machine may include a "timeout" field for specifying a window of time in which a task either completes or is considered to have timed out. In this example, the workflow interpreter may be evaluating a current state "SomeOtherState" of TABLE 9. In this example, the "SomeOtherState" sets a timeout value of 60000 milliseconds by setting the "timeout" field in the state definition, and as depicted at 610.

In this example, and as depicted at 612, if the task "NeverEndingTask" times out according to the setting of the "timeout" field of the state definition, then the task is considered to have failed, and the workflow interpreter may proceed to handle the timeout error, as depicted at 614. As depicted in TABLE 9, the timeout error may be handled by transitioning to a catch state, "CatchState" in this example.

Otherwise, if there is no timeout yet, and as depicted at 612, the timeout timer may be counted down, as depicted at 616. At 618, if the task completes, then there is no timeout error, as depicted at 620. However, if the task has not yet completed, then at some point, another determination is made as to whether the task has timed down, as depicted at 612. At some point in this example, either the task may complete before a timeout, as depicted at 620, or the task may timeout, as depicted at 614.

As noted above, for a single given state, both timeouts and heartbeats may be handled by the workflow interpreter. As discussed above with regard to TABLE 9, any given state of a state machine may include a "heartbeat" field for specifying a window of time in which a task either completes or is considered to have timed out. In general the heartbeat setting may be useful for long running tasks executing on remote systems, where a corresponding timeout may be large, for example, in terms of days, and where a user may want to have some indication before the timeout that the task is still making progress—which is one utility of using heartbeat messages and heartbeat timeouts.

In this example, and as depicted at 630, if a current state includes a "heartbeat" field specification, then a heartbeat timer may be set, as depicted at 634. Otherwise, if a "heartbeat" field is not specified for the current state, then no heartbeat monitoring is performed, as depicted at 632.

Otherwise, in this example, after the heartbeat timer is set, heartbeat messages for the task are monitored. In this example, the task being monitored may implement sending of heartbeat messages at different intervals of task execution. In this example, if a heartbeat message is not received from the task before expiration of the heartbeat timer, then, as depicted at 638, a heartbeat timeout error may be generated.

Otherwise, in this example, if there is not yet a heartbeat timeout, and if the task has completed, as depicted at 640, then there is no heartbeat timeout error, as depicted at 642. In this example, if the task is not yet complete, and if no heartbeat message has been received from the task, as depicted at 644, then the heartbeat timer is counted down, as depicted at 646, and another check is made as to whether the heartbeat timer has expired.

If, in this example, a heartbeat message is received, as depicted at 644, then the heartbeat timer is reset, as depicted at 634, and the heartbeat timer may again begin being checked for timeout.

In this way, so long as a task continues to send heartbeat messages before the heartbeat timer expires, the task is considered to be making progress, and not heartbeat timeout error is generated. As described above, this task progress information may be communication to a workflow visualization service 116 to provide a user with status information on the workflow generally, and on tasks in particular.

Further, while the task may send heartbeat messages such that the heartbeat timer never expires, and thereby avoiding a heartbeat timeout error, the task may still timeout according to the "timeout" field, as indicated by the parallel monitoring of the timeout value described above with regard.

Figure 7:
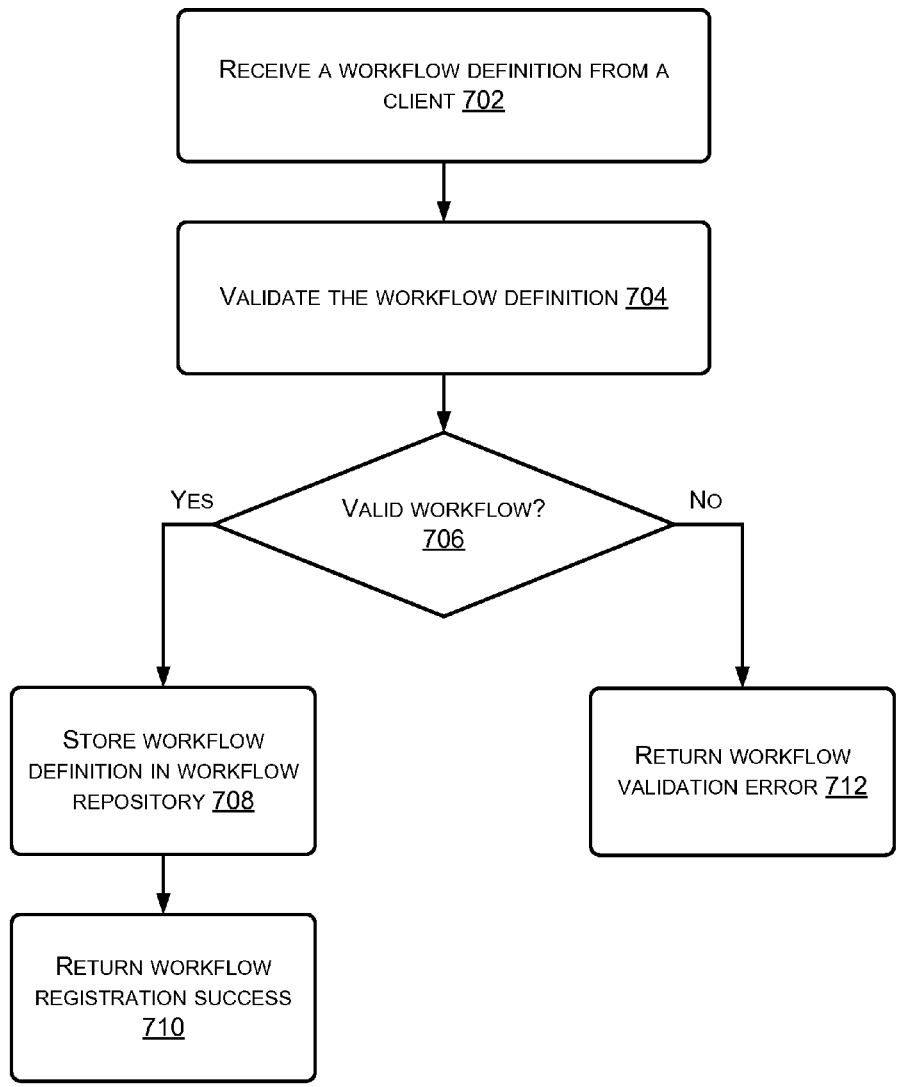
FIG. 7 is a flow diagram illustrating features of a registration and validation process for the workflow service according to some embodiments.

FIG. 7 illustrates flowchart 700 depicting example operations performed in a workflow service in receiving a workflow definition for a workflow. In this example, the workflow service may receive a workflow definition from a client, as depicted at 702. As discussed above, the workflow definition may be specified in the workflow definition language, described above, which describes a state machine for the workflow, including tasks, transitions, error handling, a terminating condition, among others.

The workflow service, given a workflow definition, may validate the workflow definition, as depicted at 704. In some cases, the validation may include validating that certain types of error handling are valid, data flows between states of the workflow state machine are valid with regard to parameter inputs and outputs, including other forms of validation.

If the workflow definition is valid, and as depicted at 706, the workflow service may store the workflow definition in a workflow repository and return a workflow registration success message, as depicted at 708 and 710, respectively. Otherwise, if the workflow definition is not determined to be valid, the workflow service may return a workflow validation error, as depicted at 712.

Once a workflow definition is successfully registered, the workflow service may invoke the workflow handling service to begin execution of the workflow.

Figure 8:
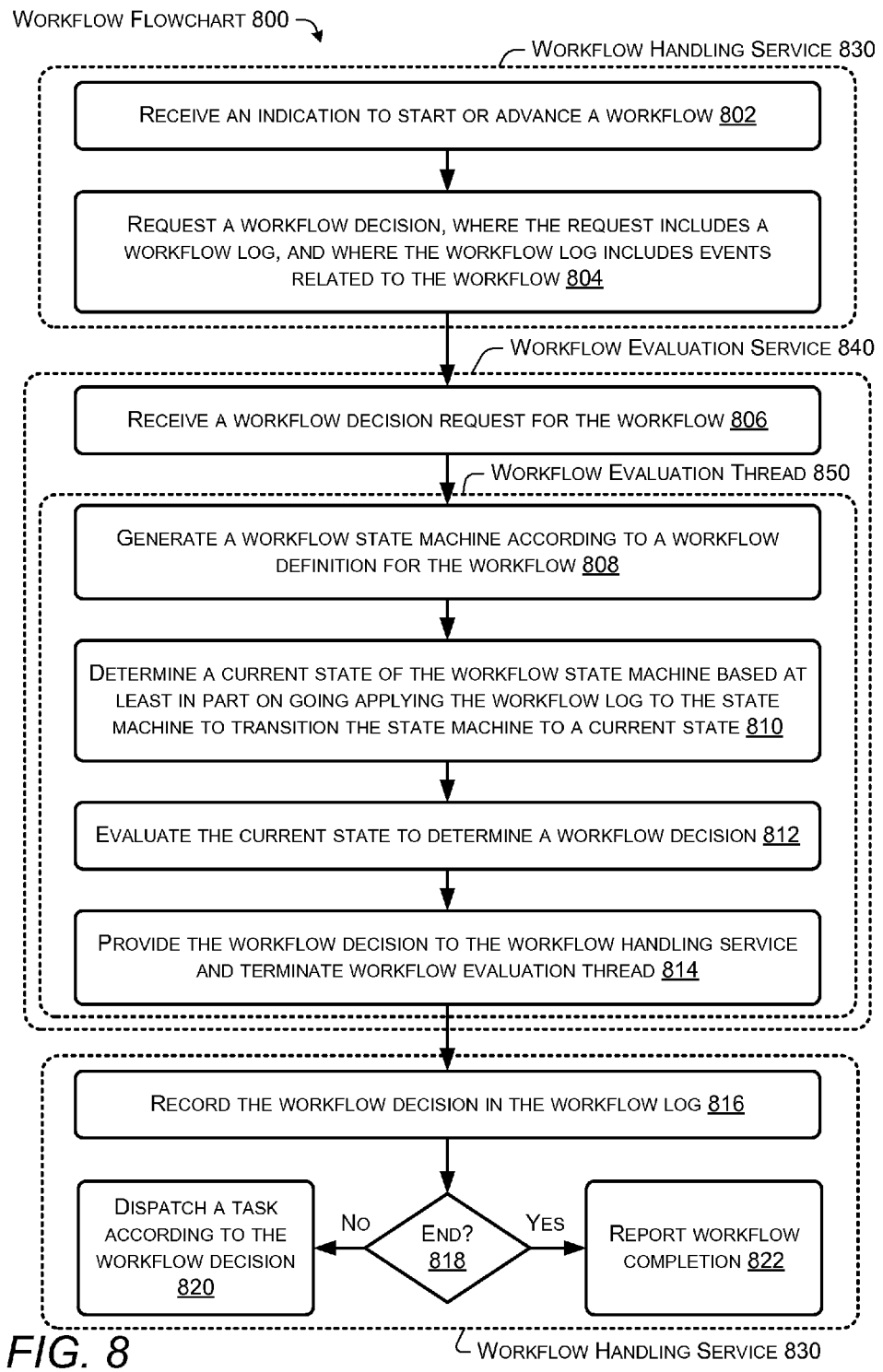
FIG. 8 is a flow diagram illustrating features of a workflow service according to some implementations.

FIG. 8 illustrates flowchart 800 depicting example operations performed in a workflow service in executing a workflow. As one example, workflow service 152 within provider network 126 may validate and register a workflow definition. As described with regard to FIG. 7, if the workflow definition is determined to be valid, the workflow handling service may be invoked to either begin executing or to advance the workflow. For example, front end 160, may call the workflow handling service with parameters indicating the workflow, and indicating that the workflow is to begin executing.

In this example, as depicted at 802, the workflow handling service may receive the call or indication to start the workflow. In other cases, once the workflow has begun executing, the workflow handling service may receive indications with regard to the already executing workflow describing a task completion event for the workflow. In such an instance, as depicted at 802, the workflow handling service may receive an indication to advance the workflow and also receive a description of, for example, a task that has completed for the workflow.

The workflow handling service may also log or record an indication of the event within a workflow log corresponding to the workflow. In this example, the workflow handling service may record an indication that the workflow was requested to begin executing or record an indication that a task for the workflow has completed. In other cases, the event may indicate a task failure, or some other status information related to the workflow, and the workflow handling service may record any and all information with regard to the workflow. Further, in some cases, the workflow handling service may log each recording of information with a sequence number or timestamp so that an order may be determined with regard to the logged information.

In this example, the workflow handling service, in response to receiving the indication to start or advance the workflow, may request a workflow decision from the workflow service, as depicted at 804. The request from the workflow handling service to the workflow service may include an indication of the workflow and the workflow log or a reference to the workflow log, where the workflow log may include events related to the workflow, as depicted at 804.

In this example, the operations performed by the workflow handling service are indicated within flowchart 800 by workflow handling service 830. The request for a workflow decision from workflow handling service 830 to the workflow evaluation service 840 may be a non-blocking request such that after the workflow handling service sends the request, the workflow handling service is available to process additional indications to start or advance other workflows while the workflow handling service 840 is processing a previous request. Further, workflow evaluation service 840 may receive a workflow decision request and create a workflow evaluation thread 850 to determine a workflow decision. In some cases, after the workflow evaluation service 840 creates and initiates a workflow evaluation thread 850, the workflow evaluation service is available to receive additional requests for additional workflow decisions. In this way, workflow evaluation service 840 may spawn any number of workflow evaluation threads to execute in parallel to determine any number of respective workflow decisions.

One effect of the workflow handling service using non-blocking requests and the workflow evaluation service spawning parallel workflow evaluation threads is that as increased numbers of workflows are created and serviced, there are no bottlenecks in the actual processing of the workflow decisions, but rather the limit is in how quickly the workflow handling service receives and sends requests for workflow decisions—which may be done efficiently since this is a small number of quick operations—and how quickly the workflow evaluation service receives and creates workflow evaluation threads—which, again, may be done efficiently since this is a small number of quick operations.

Continuing with this example, as depicted at 806, workflow evaluation service 840 may receive the workflow decision request for the workflow. In this example, the workflow decision request from the workflow handling service may include a workflow log for the workflow. To determine a workflow decision, workflow service 840 may allocate computing resources on a host computer and create a workflow evaluation thread to determine the workflow decision, where the workflow evaluation thread may execute on the allocated computing resources. In this example, the host computer may be one of multiple different host computers available to the workflow evaluation service within the provider network.

The workflow evaluation thread, once created, may proceed to generate a state machine for the workflow, where the workflow is specified according to a workflow definition, as depicted at 808. In this example, the state machine is created from scratch and has no dependencies or reliance on previously generated state machines or previously determined workflow decisions. Given a created state machine, the workflow evaluation thread may determine a current state of the workflow based at least in part on applying the workflow log to the state machine to transition the state machine to a current state of the workflow, as depicted at 810. For example, an ordered list of completed tasks in the workflow log may be accessed, and the workflow evaluation thread may correspond each completed task with a transition in the state machine as indicated by transitions specified in the workflow definition. In this way, events logged in the workflow log, in correspondence with the workflow definition, may be used to transition from an initial state of a state machine for the workflow to a current state for the workflow.

Given a current state of the state machine for the workflow, the workflow evaluation thread may evaluate the current state to determine a workflow decision, as depicted at 812. For example, the workflow evaluation thread may determine, according to the workflow definition for the workflow, that at a current state, and given previously completed tasks, that a next decision includes a particular task, operation, or decision. The workflow evaluation thread may then provide the workflow decision to the workflow handling service, as depicted at 814.

The workflow handling service, in response to receiving the workflow decision from the workflow evaluation thread, may record the workflow decision in the workflow log, as depicted at 816. Further, the workflow handling service may determine, as depicted at 818, that the workflow decision corresponds to completion of the workflow or that the workflow decision corresponds to a task.

If the workflow decision corresponds to a task to be executed for processing the workflow, as depicted at 820, then the workflow handling service may dispatch a task according to the workflow decision. In other cases, the workflow handling service may instead provide the task to be performed to a job dispatcher, where the job dispatcher may schedule the task to be executed. At this point, if the workflow handling service is not servicing additional requests to advance other workflows, then the workflow handling service may wait for a task completion event, upon which the workflow handling service may begin again as depicted at 802.

If the workflow decision corresponds to completion of the workflow, as depicted at 822, then the workflow handling service may report completion of the workflow, for example, to the front end. In turn, the front end may notify a client of the completion of the workflow.

Figure 9:
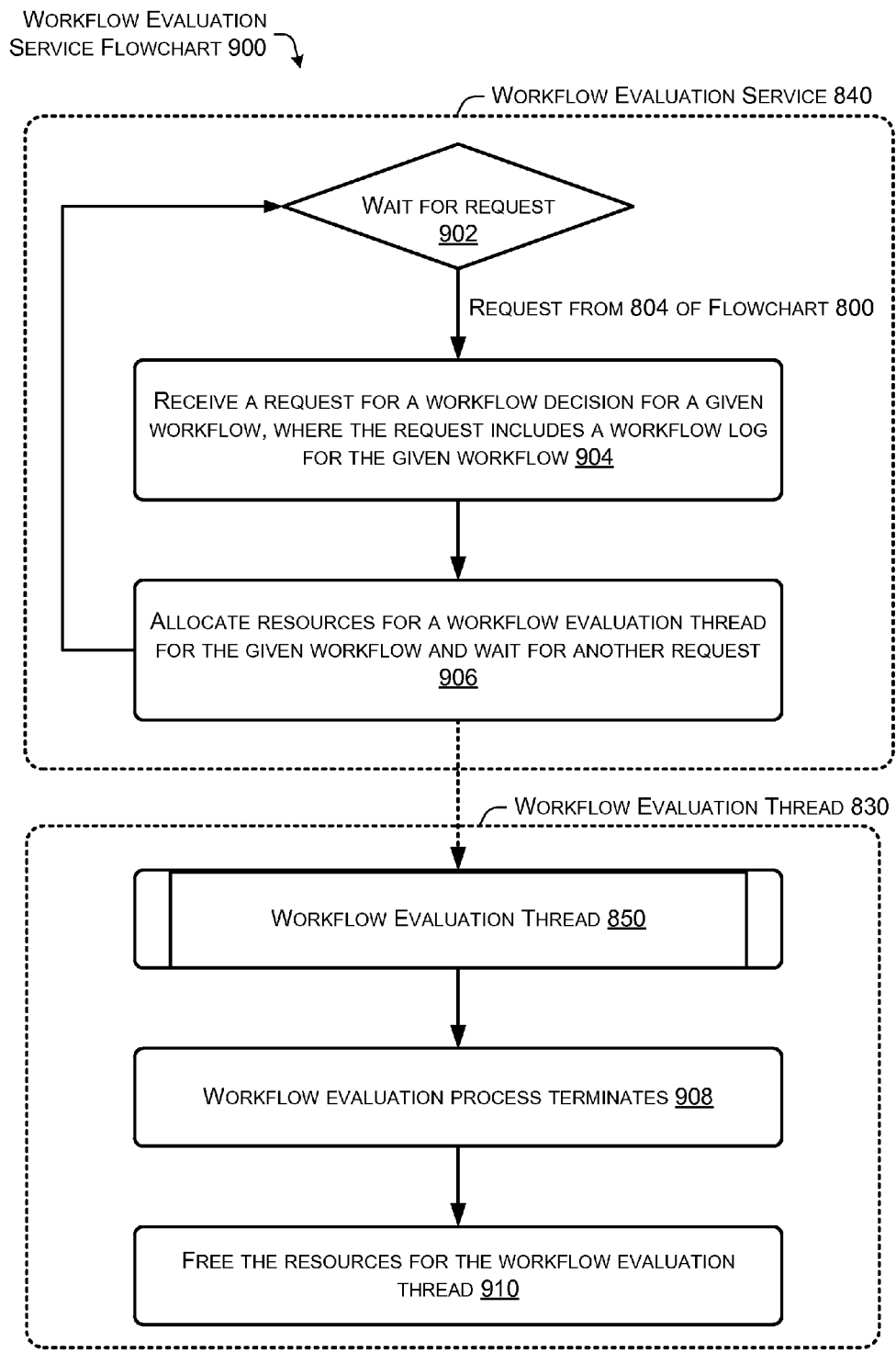
FIG. 9 is a flow diagram illustrating features of a workflow evaluation service of the workflow service according to some implementations.

FIG. 9 illustrates flowchart 900 depicting example operations performed by a workflow evaluation service. As discussed above with regard to FIG. 8, a workflow evaluation service may be workflow evaluation service 840. In between processing workflow decision requests, a workflow evaluation service may wait for request from the workflow handling service, as depicted at 902.

In this example, a request may be received from a workflow handling service, such as a request from 804 in flowchart 800 of FIG. 8. As depicted at 904, the workflow evaluation service may then receive the request for a workflow decision from the workflow handling service, where the request may include a workflow log for the workflow.

As described above with regard to FIG. 8, the workflow evaluation service, to determine a workflow decision, may allocate computing resources for executing a workflow evaluation thread that determines and returns the workflow decision to the workflow handling service, as depicted at 906, where after the workflow evaluation thread is created and initiated, the workflow evaluation service may wait for additional requests, as depicted at 406.

As described above with regard to FIG. 8, the workflow evaluation thread may proceed to determine a workflow decision for the workflow, including the operations 808-814 of FIG. 8. After the workflow evaluation thread provides the workflow handling service with a workflow decision, the workflow evaluation thread may terminate and the allocated computing resources used to execute the workflow evaluation thread may be freed, as depicted at 908 and 910. In this way, the allocated resources may be made available for processing other workflow decisions.

As discussed above, the allocated resources may be freed or unallocated because each time a request for a workflow decision is received, a workflow evaluation thread may determine, from scratch or entirely from the workflow log and workflow definition, a current state for the workflow and a next workflow decision.

Figure 10:
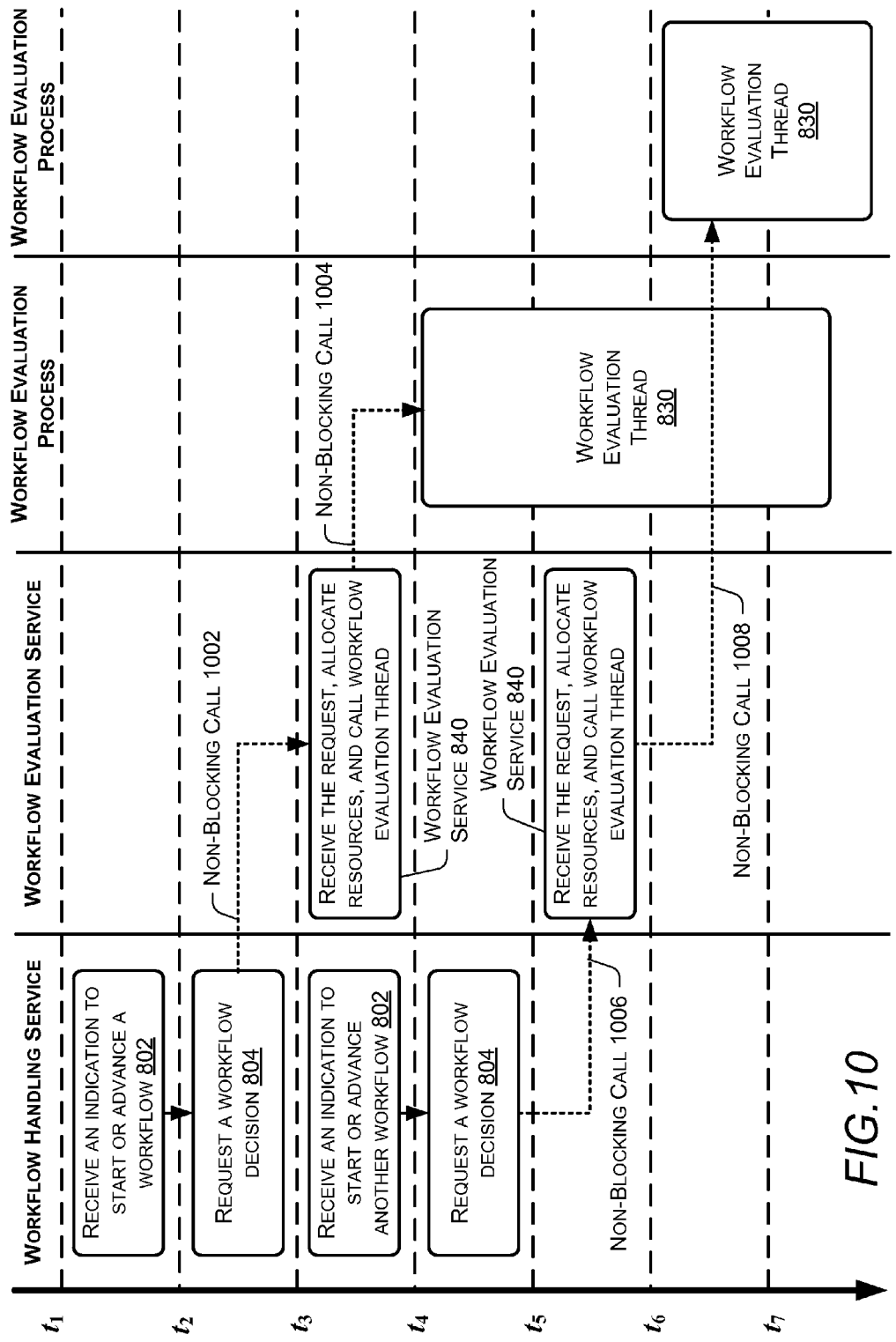
FIG. 10 is a flow diagram illustrating features of a workflow handling service and workflow evaluation service of a workflow service operating in parallel according to some implementations.

FIG. 10 illustrates parallel operations between the workflow handling service, the workflow evaluation service, and workflow evaluation threads discussed above with regard to FIGS. 7-9. In this example, the workflow handling service may receive an indication to start or advance a workflow, as depicted at 802 at time $t_1$, where 802 corresponds to the operations described above with regard to FIG. 8.

In this example, the workflow handling service may then request a decision for a workflow decision for a first workflow, as depicted at 804 at time $t_2$. Further, the request from the workflow handling service to the workflow evaluation service may be a non-blocking call, as depicted by non-blocking call 1002. Given that the request for a workflow decision is non-blocking, as soon as the workflow handling service makes the request, the workflow handling service is available to process or receive additional requests, which in this example, is depicted at 802 at time $t_3$.

In this example, the request from the workflow handling service is received by the workflow evaluation service at time $t_3$, which as described above, is also approximately the time at which the workflow handling service receives another indication to start or advance another workflow. As depicted by workflow evaluation service 840 at time $t_3$, the workflow evaluation service may receive the request for a workflow decision, along with a workflow log, allocate computing resources for a workflow evaluation thread to determine the workflow decision and then proceed to initiate or call the workflow evaluation thread. In this example, the call to the workflow evaluation thread from the workflow evaluation service 840 at time $t_3$ is depicted by non-blocking call 1004.

As depicted at time t4, at this point, the workflow handling service has already received an indication to start or advance another workflow, and may then request a workflow decision via non-blocking call 1006. Further at time t4, a workflow evaluation thread for determining a workflow decision for the first workflow has been started, as depicted by workflow evaluation thread 430 called by non-blocking call 1004.

The request for a workflow decision for the other workflow at time t4 and via non-blocking call 1006 may be received by workflow evaluation service 840 at time t5. Further at time t5, while the workflow evaluation service 840 is processing the request for the other workflow decision, the workflow evaluation thread 430 initiated at time t4 for the first workflow decision is still executing.

Further as depicted at time t5, after the workflow evaluation service 840 allocates computing resources for a workflow evaluation thread to determine the other workflow decision, the workflow evaluation service 840 may call the workflow evaluation thread 430 via non-blocking call 1008.

As depicted at time t6, at this point, both workflow evaluation thread 430 initiated at time t4 to determine the first workflow decision and workflow evaluation thread 430 initiated at time t6 to determine the other workflow decision are executing. As described above, the different workflow evaluation threads may be executing on different allocated resources, and in some cases, the different allocated resources may be on different host computers of the provider network. In other cases, the different allocated resources may be on the same host computer of the provider network. As discussed below in FIG. 11, a determination of what resources to use to execute the workflow evaluation threads may be made by a load balancer.

Figure 11:
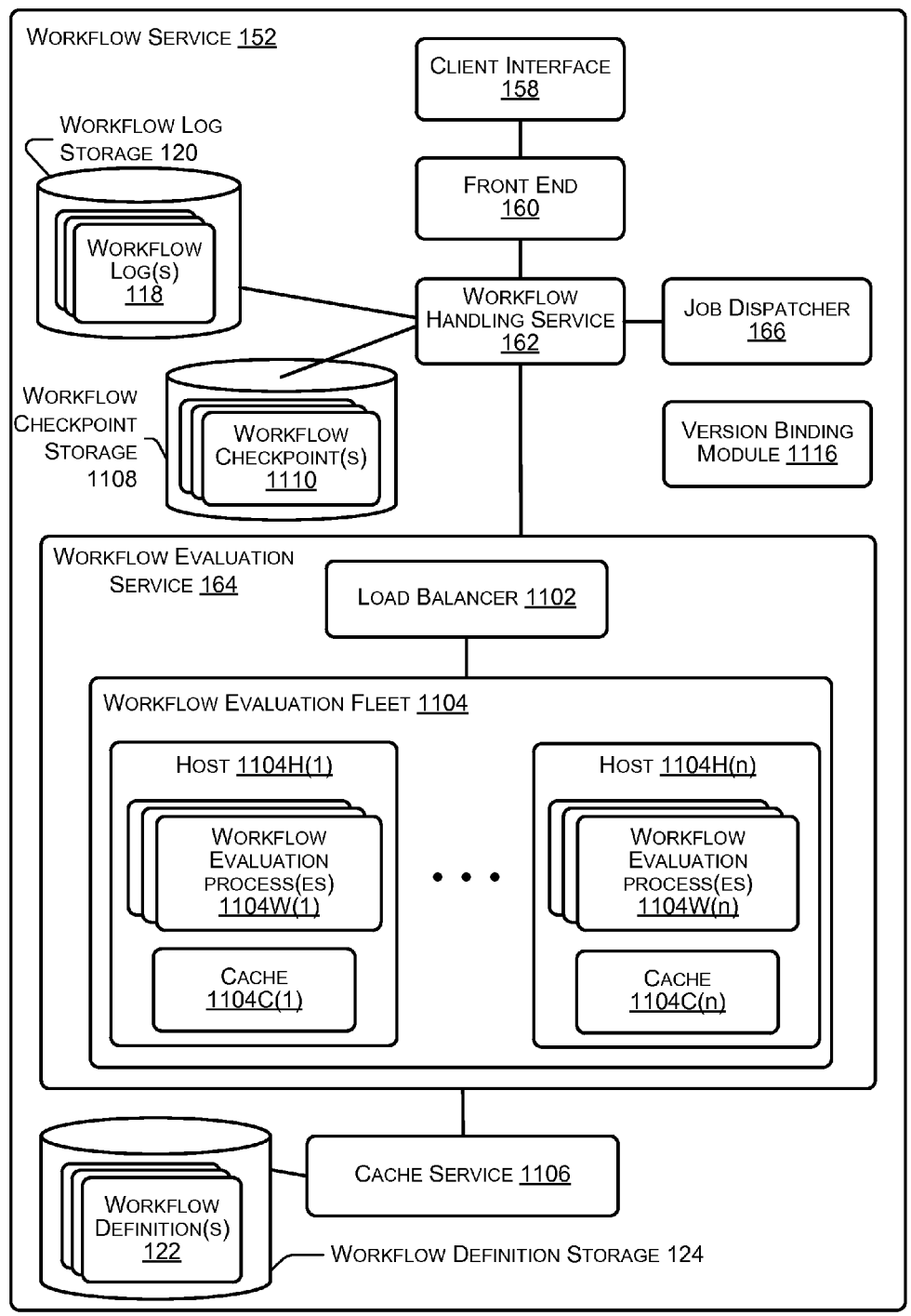
FIG. 11 is another illustrative architecture depicting an example workflow service within a provider network according to some implementations.

FIG. 11 illustrates an embodiment of workflow service 152 with additional possible features. In this embodiment, workflow service 152 includes, as depicted in FIG. 1B, client interface 158, front end 160, workflow handling service 162, and job dispatcher 166. However, in this example, workflow evaluation service 164 includes a load balancer, load balancer 1102, and a workflow evaluation fleet of host computers or systems, hosts 1104H(1)-1104H(n).

As discussed above with regard to FIG. 10, a workflow evaluation service may receive multiple requests from a workflow handling service for different workflow decisions for different workflows. In such an example, the workflow evaluation service may determine how to distribute processing of the workflow decisions. As depicted, the workflow evaluation service may include a load balancer that serves to receive multiple requests for workflow decisions, and to determine which computing resources to deploy for executing respective workflow evaluation threads for determining the workflow decisions.

In this example, the computing resources from among which the load balancer 1102 may deploy for executing different workflow evaluation threads is depicted by workflow evaluation fleet 1104. In this example, workflow evaluation fleet 1104 may include multiple computing hosts, hosts 1104H(1)-1104H(n). Example workflow evaluation threads are depicted by workflow evaluation threads 1104W(1)-1104W(n).

In some embodiments, each of computing hosts 1104H(1)-1104H(n) may include a respective local cache, local caches 1104C(1)-1104C(n). While the examples discussed above with regard to FIGS. 1-5 describe workflow evaluation services and workflow evaluation threads that operate without persisting a current workflow state for a workflow from one instance of a workflow evaluation thread to a subsequent instance of a workflow evaluation thread, in some cases, while the workflow evaluation thread may terminate, the state machine created by the workflow evaluation thread may remain stored in a local cache for the host on which the workflow evaluation thread executed.

In some cases, for example in a workflow that quickly transitions between states of the state machine for the workflow, a state machine created by a workflow evaluation thread at, say, time $t_0$, may still reside in the local cache when a subsequent workflow evaluation thread executes at, say, time $t_n$. In different example, the local cache for a given host may store data according to different retention policies.

Further, in some instances, it may be that while a state machine for a given workflow may be in a local cache, say local cache 1104C(1), when a subsequent workflow evaluation thread is initiated, the load balancer may deploy the subsequent workflow evaluation thread to execute on a different host and different local cache, for example host 1104H(n) and local cache 1104C(n). In such an example, the previously constructed state machine for the given workflow may not be available to the subsequent workflow evaluation thread even thought the state machine for the given workflow still resides in a different local cache.

To overcome such a situation, in some embodiments, the workflow evaluation service may use a cache service, such as cache service 1106. Cache service 1106 may be a distributed cache, and in some cases, cache service 1106 may be the storage tier from which data in the host caches move data. For example, in the previous example, where a load balancer deploys a workflow evaluation thread to determine a workflow decision from host 1104H(1), and the state machine for the workflow is stored in local cache 1104C(1), the state machine may be flushed or copied from local cache 1104C(1) into cache service 1106.

In this way, in this example, at a subsequent time, when a subsequent workflow evaluation thread for the given workflow executes from a different host, the workflow evaluation thread may access the state machine for the workflow from the cache service 1106. In such an example, the subsequent workflow evaluation thread may determine a workflow decision without constructing a state machine from the workflow definition.

In other embodiments, a workflow service may also use checkpoints to determine a current state of a state machine without transitioning through all states of the state machine from the initial state to a current state. For example, the workflow handling service may periodically or aperiodically store a checkpoint, where the checkpoint defines a particular state of the state machine up to a particular point in the workflow. In this example, a workflow evaluation thread may apply the checkpoint to the state machine to reach the particular state of the state machine. In some implementations, the checkpoint for a workflow may be received as a parameter of the request for a workflow decision and passed from the workflow evaluation service to the workflow evaluation thread. In other implementations, the workflow evaluation service or the workflow evaluation thread may access the checkpoint corresponding to a given workflow from a data store or database service. In this example, the workflow evaluation thread may then reference the workflow log to transition the state machine from the particular state to the current state of the state machine, for example. For example, the workflow evaluation thread may find an event in the workflow log corresponding to the checkpoint, and transition the state machine using events subsequent to the checkpoint up to a current event. Further in this example, the workflow checkpoints are indicated by workflow checkpoints 1110, and may be stored in workflow checkpoint storage 1108.

Further, in this embodiment of workflow service 152, the workflow handling service may use a workflow log storage for maintaining current workflow logs, such as workflow log storage 120. As depicted, workflow log storage 120 may store workflow logs 118.

In some embodiments, workflow service 152 may also include a version binding module, such as version binding module 1116. As described above, a single workflow definition may be used to create multiple instances of a workflow. In such an example, the processing for each different workflow still corresponds to the same workflow definition. However, in some cases, a version binding module may be used to correspond, or bind, different workflow definition versions with different instances of workflows. For example, a client may create a workflow definition and create a corresponding workflow. While this workflow is executing, the client may create an updated version of the workflow definition and create another workflow using the updated workflow definition. In this way, the other workflow using the updated workflow definition may be created and started while the workflow using the previous version of the workflow definition is still executing. In other words, a workflow definition version may be maintained and bound to an executing workflow for the execution life cycle of the workflow. Further, any number of workflows using different versions of may be concurrently executing, thus allowing for rolling releases of workflows for workflow definitions with different sets of features. In some examples, the front end of the workflow service may provide the user with choosing any given version, past or current, of a workflow definition from which to start a workflow.

Figure 12:
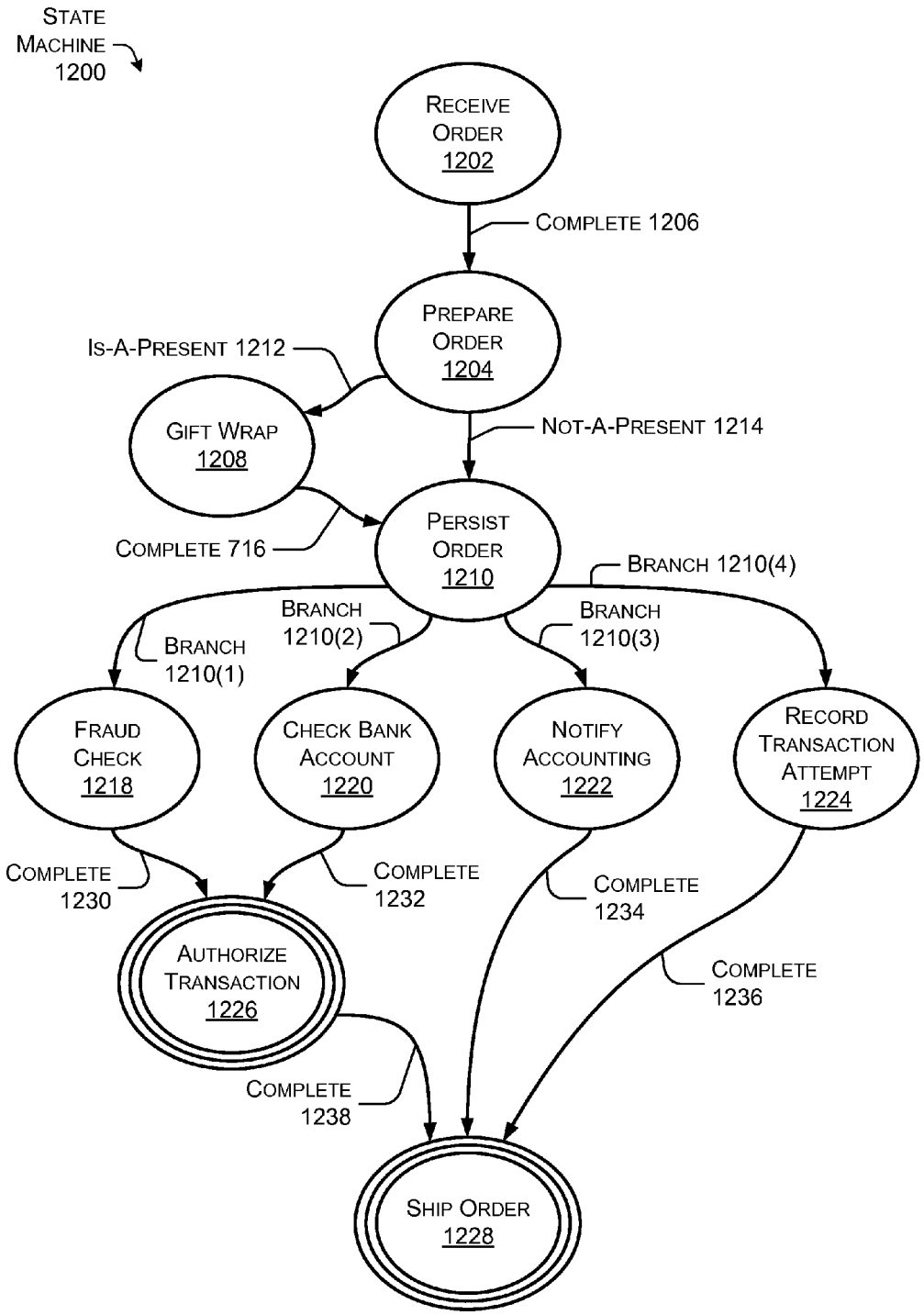
FIG. 12 is a flow diagram illustrating features of an example state machine for a workflow definition for a workflow according to some implementations.

FIG. 12 illustrates an example state machine, state machine 1200, corresponding to a workflow, such as a workflow defined according to a workflow definition. In this example, the workflow includes multiple states and different types of transitions in between states. In other examples, different numbers, different types, and different types of transitions may be specified in defining a workflow. As discussed above, in some embodiments, a workflow definition may be specified according to the workflow definition language for defining the states, transitions, and tasks of a state machine for a workflow.

In this example, a workflow may be defined to perform order fulfillment services. For example, the first state of a state machine for the workflow may be defined to be receiving an order, as depicted at 1202. With regard to the workflow handling service described above with regard to FIGS. 6-11, state machine 1200 specified within a workflow definition for a workflow may be received and validated by front end 160 of the workflow service. The front end, based on validating the workflow definition, may call the workflow handling service to start the workflow. The workflow, in turn, may then send a request for a workflow decision for the workflow to the workflow evaluation service, where the workflow log for the workflow may be empty of any completed tasks, but may include a record of an indication to start the workflow. After sending the request for the workflow decision, the workflow handling service may then wait for a next request to advance or start a workflow until it receives the workflow decision.

In some cases, a single state of a state machine for a workflow may be specified according to the workflow definition language to be a state module that includes one or more tasks, an identification of one or more resources for performing the one or more tasks, and one or more transitions or branches to other states. Together, the individually defined states may be interpreted as a whole to specify the operations to be executed in servicing a workflow.

In this example, a first state of the state machine for the workflow, receive order 1202, may specify using the workflow definition language that a task to be performed uses a resource provided by a particular service, and that upon completion of the task, receive order 1202 state transitions to prepare order 1204 state. In this example, completion of the task for the receive order 1202 state is indicated by complete 1206.

Again, with regard to the workflow handling service and the workflow evaluation service, after the workflow evaluation service receives the request for a workflow decision, the workflow evaluation service may, as depicted in FIG. 9, allocate computing resources for a workflow evaluation thread to determine the workflow decision. Once initiated, the workflow evaluation thread may access the workflow definition that specifies the state machine for the workflow and construct the state machine. Given a constructed state machine, in this case state machine 1200, the workflow evaluation thread may determine the first state and access the workflow log to traverse through the state based on events logged in the workflow log until a current state of the state machine is reached.

In this example, given the constructed state machine and a workflow log for the workflow indicating that no tasks have been completed for the state machine, the workflow evaluation thread may determine that the current state is receive order 1202. Further, the workflow evaluation thread may use the workflow definition to determine that given the current state of receive order 1202, that the workflow decision should be to perform a task indicated by the state module for the receive order 1202 state. This workflow decision may be provided to the workflow handling service for scheduling of the task.

At a later time, when a notification corresponding to a completion of the task for the receive order 1202 state is received by the workflow handling service, the workflow handling service may again request a workflow decision from the workflow evaluation service. At this point, the first task of the workflow for fulfilling an order may be completed.

In response to receiving a request to advance to the workflow, the workflow handling service may again send a request for a workflow decision to the workflow evaluation service. The workflow evaluation service may repeat the process for handling a request for a workflow decision. However, at this point, the workflow evaluation thread that is created accesses the same workflow definition as the first workflow evaluation thread, but the workflow log may include a record of the first task having been completed. Accordingly, after constructing state machine 1200, the workflow evaluation thread may end up a current state of prepare order 1204 based on the workflow log indicating that the task for receive order 1202 having been completed.

Given that each workflow evaluation thread uses the workflow definition and workflow log to determine a current state, there is no data flow from one workflow evaluation thread to a subsequent workflow evaluation thread, thereby allowing each subsequent workflow evaluation thread to be scheduled to execute on different computing resources without any negative computational impact. Further, such scheduling allows a load balancer the flexibility to deploy any computing resources without regard to which resource was previously used to process a workflow decision request. Further still, given that each workflow evaluation thread may independently determine a current state for a state machine, the load balancer may use any factors to determine the computing resources to be deployed. Including, for example, workloads on a given host, price constraints in a client contract for provider services, performance requirements specified in a client contrast for provider services, or a combination of factors, including other factors.

At this point in the workflow, the workflow handling service may receive a workflow decision for the workflow and schedule a corresponding task for the prepare order 1204 state. In this example, depending on whether or not the order is a gift, the workflow evaluation service may provide the workflow handling service with a workflow decision corresponding to a task to gift wrap the order or the persist the order, as depicted at gift wrap 1208 and persist order 1210. Further, the transitions between prepare order 1204 and gift wrap 1208 is depicted by is-a-present 1212, and the transition between prepare order 1204 and persist order 1210 is depicted by not-a-present 1214. The transition in between the gift wrap 1208 state and the persist order 1210 state is depicted by complete 1216.

From the persist order 1210 state, the workflow evaluation service may determine that there four tasks to schedule as part of a workflow decision for the four branches from the persist order 1210 state, branches 1210(1)-1210(4). Accordingly, the workflow handling service may schedule for execution tasks corresponding, respectively, fraud check 1218, check bank account 1220, notify accounting 1222, and record transaction attempt 1224.

In this example, when the task corresponding to the fraud check 1218 state completes, the workflow handling service is called, which requests a workflow decision from the workflow evaluation service. In this example, the workflow evaluation thread may reach the authorize transaction 1226 state, but the authorize transaction 1226 state may specify that both the fraud check 1218 task or tasks and the check bank account 1220 task or tasks are to be completed before tasks for the authorize transaction 1226 state are performed. The transition between the fraud check 1218 state and the authorize transaction 1226 state is depicted by complete 1230, and the transition between the check bank account 1220 state and the authorize transaction 1226 state is depicted by complete 1232.

Therefore, in this example, the workflow evaluation thread may return to the workflow evaluation service a workflow decision to do nothing. However, when the workflow handling service is called due to check bank account 1220 task or tasks being completed, the workflow evaluation thread may determine that preconditions for executing have been satisfied, and generate a workflow decision corresponding to authorization of the transaction, as depicted at 1226.

Similarly, the ship order 1228 state may not have any corresponding tasks execute until tasks corresponding, respectively, to authorize transaction 1226, notify accounting 1222, and record transaction attempt 1224 have completed. The transition between the notify accounting 1222 state and the ship order 1228 state is depicted by complete 1234, the transition between the record transaction attempt 1224 state and the ship order 1228 state is depicted by complete 1236, and the transition between the authorize transaction 1226 state and the ship order 1228 state is depicted by complete 1238.

In this way, a workflow service may process the workflow corresponding to state machine 1200, and correspondingly, fulfill an order.

Figure 13:
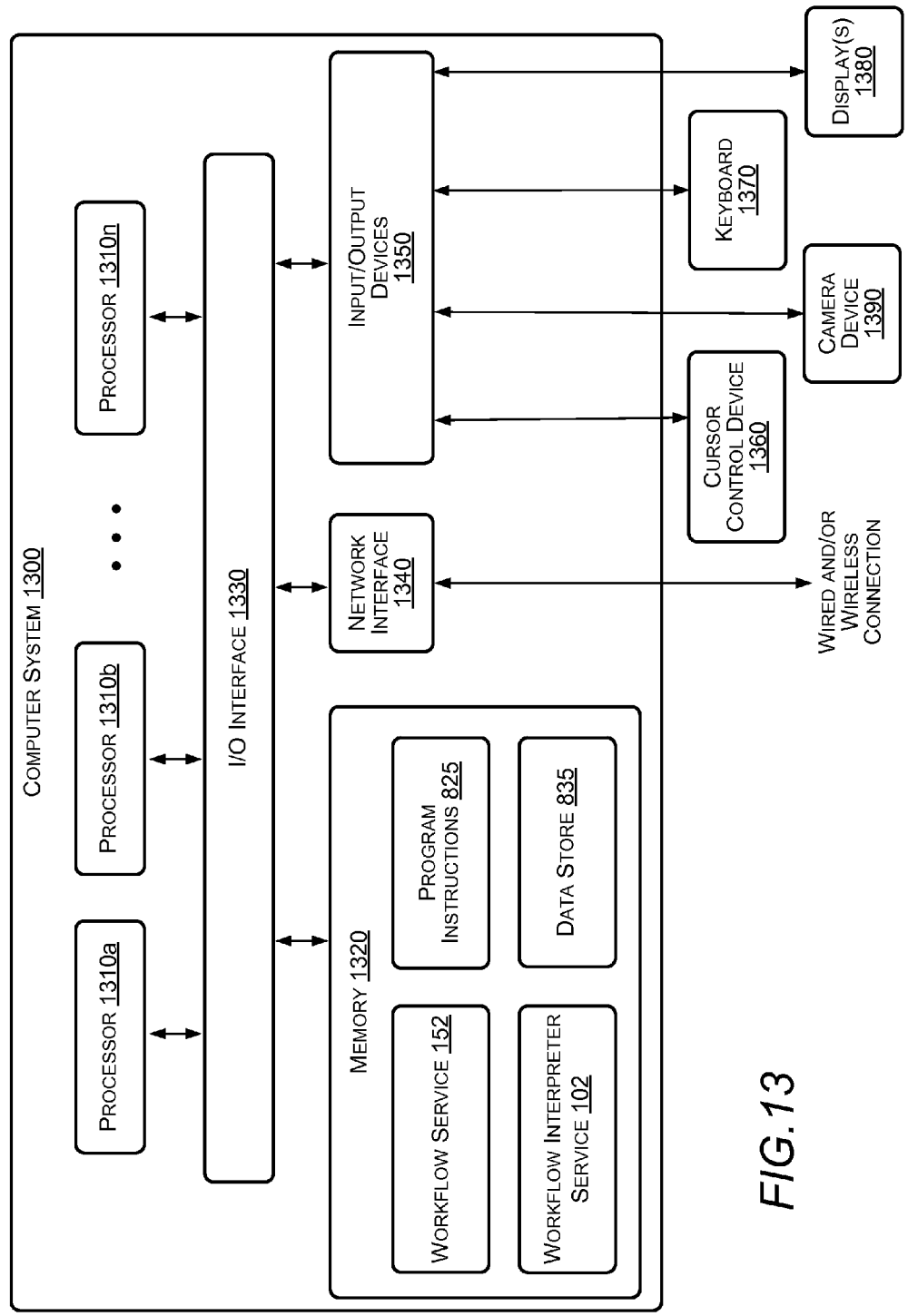
FIG. 13 illustrates a computer system including an implementation of a workflow service according to some implementations.

FIG. 13 illustrates an example computer system, computer system 1300, where computer system 1300 may be configured to implement different workflow service implementations, according to the discussed embodiments and examples. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device. Generally, the methods described herein may in various embodiments be implemented by any combination of hardware and software.

Further, the methods described herein may in various embodiments be implemented by any combination of hardware and software. For example, the methods may be implemented by computer system 1300 that includes one or more processors executing program instructions stored on a computer-readable storage medium coupled to the processors. The program instructions may be configured to implement the functionality described herein (e.g., the functionality of various servers and other components that implement the look-up component described herein). The various methods as illustrated in the figures and described herein represent example embodiments of methods. The order of any method may be changed, and various elements may be added, reordered, combined, omitted, or modified.

Computer system 1300 includes one or more processors 1310a-1310n (any of which may include multiple cores, which may be single or multi-threaded) coupled to a system memory 1320 via an input/output (I/O) interface 1330. Computer system 1300 further includes a network interface 1340 coupled to I/O interface 1330. In various embodiments, computer system 1300 may be a uniprocessor system including one processor, or a multiprocessor system including several processors (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. The computer system 1300 also includes one or more network communication devices (e.g., network interface 1340) for communicating with other systems and/or components over a communications network (e.g. Internet, LAN, etc.). For example, a client application executing on system 1300 may use network interface 640 to communicate with a server application executing on a single server or on a cluster of servers that implement one or more of the components of the systems described herein. In another example, an instance of a server application executing on computer system 1300 may use network interface 1340 to communicate with other instances of the server application (or another server application) that may be implemented on other computer systems. Further, computer system 1300, via I/O interface 1330, may be coupled to one or more input/output devices 1350, such as cursor control device 1360, keyboard 1370, camera device 1390, and one or more displays 1380.

In the illustrated embodiment, computer system 1300 also includes one or more persistent storage devices and/or one or more I/O devices 1350. In various embodiments, persistent storage devices may correspond to disk drives, tape drives, solid state memory, other mass storage devices, or any other persistent storage device. Computer system 1300 (or a distributed application or operating system operating thereon) may store instructions and/or data in persistent storage devices, as desired, and may retrieve the stored instruction and/or data as needed. For example, in some embodiments, computer system 1300 may host a storage system server node, and persistent storage may include the SSDs attached to that server node.

Computer system 1300 includes one or more system memories 1320 that are configured to store instructions and data accessible by processor(s) 1310. In various embodiments, system memories 1320 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1320 may contain program instructions 1325 that are executable by processor(s) 1310 to implement the methods and techniques described herein. In various embodiments, program instructions 1325 may be encoded in platform native binary, any interpreted language such as Java™ bytecode, or in any other language such as C/C++, Java™, etc., or in any combination thereof. For example, in the illustrated embodiment, program instructions 1325 include program instructions executable to implement the functionality of a database service, tracking-enabled client, update tracker, update listener, and/or update consumer in different embodiments. In some embodiments, program instructions 1325 may implement multiple separate clients, server nodes, and/or other components.

In some embodiments, program instructions 1325 may include instructions executable to implement an operating system (not shown), which may be any of various operating systems, such as UNIX, LINUX, Solaris™, MacOS™, Windows™, etc. Any or all of program instructions 1325 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 600 as system memory 1320 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1340.

In some embodiments, system memory 1320 may include data store 1335, which may be configured as described herein. In general, system memory 1320 (e.g., data store 1335 within system memory 1320), persistent storage, and/ or remote storage may store data blocks, replicas of data blocks, metadata associated with data blocks and/or their state, configuration information, and/or any other information usable in implementing the methods and techniques described herein. Further, data store 1320 may include modules for implementing an active content filter 110 in an embodiment of a static content endpoint server.

In one embodiment, I/O interface 1330 may be configured to coordinate I/O traffic between processor(s) 1310, system memory 1320 and any peripheral devices in the system, including through network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor(s) 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor(s) 1310.

Network interface 1340 may be configured to allow data to be exchanged between computer system 1300 and other devices attached to a network, such as other computer systems (which may implement one or more storage system server nodes, database engine head nodes, and/or clients of the database systems described herein), for example. In addition, network interface 1340 may be configured to allow communication between computer system 1300 and various I/O devices 1350 and/or remote storage. Input/output devices 1350 may, in some embodiments, include one or more display terminals, keyboards, keypads, touchpads, scanning devices, voice or optical recognition devices, or any other devices suitable for entering or retrieving data by one or more computer systems 1300. Multiple input/output devices 1350 may be present in computer system 1300 or may be distributed on various nodes of a distributed system that includes computer system 1300. In some embodiments, similar input/output devices may be separate from computer system 1300 and may interact with one or more nodes of a distributed system that includes computer system 1300 through a wired or wireless connection, such as over network interface 1340. Network interface 1340 may commonly support one or more wireless networking protocols (e.g., Wi-Fi/IEEE 802.11, or another wireless networking standard). However, in various embodiments, network interface 1340 may support communication via any suitable wired or wireless general data networks, such as other types of Ethernet networks, for example. Additionally, network interface 1340 may support communication via telecommunications/telephony networks such as analog voice networks or digital fiber communications networks, via storage area networks such as Fibre Channel SANs, or via any other suitable type of network and/or protocol. In various embodiments, computer system 1300 may include more, fewer, or different components than those illustrated (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a workflow data store configured to store workflow definitions, wherein respective workflow definitions stored in the data store comprise statements according to a workflow definition language, wherein the statements define states of a respective workflow, and wherein the statements include fields specifying:
      a task to be performed for the respective workflow; and
      an error handling mechanism, wherein the error handling mechanism includes:
         a timeout specification for the task; and
         a heartbeat specification for the task; and
   a workflow service implemented by one or more computing devices and configured to:
      receive a given workflow definition of the workflow definitions from the data store for a particular workflow;
      construct a state machine for the particular workflow as defined in the given workflow definition for the particular workflow;
      execute the particular workflow according to the state machine, wherein to execute the particular workflow, the workflow service is further configured to:
         determine, according to the given workflow definition for a current state of the workflow, a particular task, a particular timeout specification for the particular task, and a particular heartbeat specification for the particular task;
         request execution of the particular task, set a heartbeat timer according to the heartbeat specification, and set a timeout timer according to the timeout specification;
         transition from the current state to an error handling state based at least on either a heartbeat message not being received from the particular task before expiration of the heartbeat timer or the timeout timer expiring before the particular task completes execution; and
         transition from the current state to a next state in the state machine based at least on the particular task completing execution without either the heartbeat timer expiring or the timeout timer expiring.

2. The system of claim 1, wherein the workflow service further comprises:
   a workflow handling service implemented by one or more computing devices and configured to:
      maintain workflow logs for respective workflows, wherein a workflow log logs the data flow object for the particular workflow with respect to different events, wherein different entries in the particular workflow log include different versions of the data flow object; and
      request a workflow decision for the particular workflow to determine a task to schedule.

3. The system of claim 2, wherein the workflow service further comprises:
   a workflow evaluation service implemented by one or more computing devices and configured to:
      receive the request for the workflow decision for the particular workflow, wherein the request includes at least a portion of the particular workflow log for the particular workflow including at least a portion of the different versions of the data flow object; and
   a workflow definition interpreter implemented by one or more computing devices and configured to interpret the particular workflow definition to:
      perform the constructing of the state machine;
      use the workflow log for the particular workflow to transition the state machine to the current state;
      perform the determining of the particular task, the particular timeout specification, and the particular heartbeat specification;
      perform the execution of the particular task, set the heartbeat timer according to the heartbeat specification, and set the timeout timer according to the timeout specification;
      perform the transition from the current state to an error handling state; and
      perform transition from the current state to a next state in the state machine.

4. The system of claim 3, wherein
   the workflow evaluation service is further configured to:
      send the workflow decision for the particular workflow to the workflow handling service, wherein the workflow decision specifies the one or more tasks defined for the current state; and
   the workflow handling service is further configured to:
      receive the workflow decision from the workflow evaluation service;
      log the workflow decision and the adjusted data flow object in the workflow log for the particular workflow; and schedule for execution the one or more tasks corresponding to the workflow decision.

5. The system of claim 1, wherein the workflow service is further configured to:
   send, to a visualization service, a message indicating beginning execution of the particular task;
   receive the heartbeat message from the particular task and reset the heartbeat timer; and
   send, to the visualization service, a message indicating that the heartbeat message has been received from the particular task.

6. A method, comprising:
   performing, by one or more hardware processors:
      receiving a workflow definition for a workflow, wherein the workflow definition comprises statements according to a workflow definition language, wherein the statements are associated with states of the workflow, and wherein the statements include:
         a field specifying a task to be performed for the workflow;
         a separate field specifying a retry specification indicating information for retrying the task in response to an error; and
         a separate field specifying a catch specification indicating an error handling state transition for one or more errors;
      constructing a state machine for the workflow as defined in the workflow definition for the workflow; and
      executing the workflow according to the state machine, wherein the executing the workflow comprises:
         requesting execution of the task to be performed;
         determining that execution of the task has generated the error;
         retrying, according to the retry specification, execution of the task;
         determining that the retrying of the execution of the task has failed; and
         transitioning, according to the catch specification, to an error handling state.

7. The method of claim 6,
   wherein the statements according to the workflow definition language further include fields specifying: a timeout specification for the task, and a heartbeat specification for the task;
   wherein the method further comprises:
      setting a heartbeat timer according to the heartbeat specification;
      setting a timeout timer according to the timeout specification;
      receiving one or more heartbeat messages from the task; and
      resetting the heartbeat timer in response to each received heartbeat message; and
   wherein the error indicates expiration of the heartbeat timer.

8. The method of claim 6,
   wherein the statements according to the workflow definition language further include fields specifying: a timeout specification for the task, and a heartbeat specification for the task;
   wherein the method further comprises receiving one or more heartbeat messages from the task; and
   wherein the error indicates expiration of the timeout timer without an indication of the task completing successfully.

9. The method of claim 6, wherein, in accordance with the workflow definition language, the workflow definition for the current state of the workflow includes the field specifying the retry field further includes:
   a specification of a list of error conditions;
   a specification of a retry interval;
   a specification of a backoff coefficient;
   a specification of a maximum retry interval; or
   a specification of maximum attempts.

10. The method of claim 9, wherein the list of error conditions in the retry field includes an error condition for the error, and wherein the method further comprises:
   determining that the error condition has been set during execution of the task;
   matching the error condition from the determining of the error condition in the list of error conditions; and
   wherein the retrying, in accordance with the specification of the retry field of the current state, of the execution of the task is based on the matching of the error condition.

11. The method of claim 10, wherein the retry interval in the retry field specifies a retry interval of time, and wherein the method further comprises:
   waiting to retry the task for an interval of time corresponding to the retry interval of time.

12. The method of claim 11, wherein the backoff coefficient specifies a coefficient value, wherein the maximum retry interval specifies a maximum retry interval of time, wherein the maximum retry interval specifies a maximum retry interval of time, wherein the maximum attempts specifies a maximum attempts value, and wherein the method further comprises:
   determining that the error condition has been reset;
   matching the error condition to the error condition in the list of error conditions;
   determining another interval of time; and
   retrying the task after an interval of time corresponding to the other interval of time has elapsed.

13. The method of claim 6, wherein the field specifying the catch field further specifies:
   the error handling state; and
   a list of error conditions to match, wherein list of error conditions includes an error condition matching a heartbeat error condition and an error condition matching a timeout error condition.

14. The method of claim 13, wherein the method further comprises:
   setting the timeout error condition in response to the timeout timer expiring; and
   matching the timeout error condition to the timeout error condition in the list of error conditions;
   wherein the transitioning to the error handling state is based at least in part on the matching the timeout error condition to the timeout error condition in the list of error conditions.

15. A non-transitory, computer-readable storage medium storing program instructions that when executed on one or more hardware processors configure a workflow service to:
   receive a workflow definition for a workflow, wherein the workflow definition comprises statements according to a workflow definition language, wherein the statements define states of the workflow, and wherein the statements include:
      a field specifying a task to be performed for the workflow;
      a separate field specifying retry information for retrying the task; and a separate field specifying error handling information handling for one or more errors;

construct a state machine for the workflow as defined in the workflow definition for the workflow;

execute the workflow according to the state machine, wherein to execute the workflow includes:

determining the task to be performed;

requesting execution of the task;

determining that execution of the task has generated the error;

retrying, according to the retry information, execution of the task;

determine that the retry of the execution of the task has failed; and transition, according to the error handling information, to an error handling state.

16. The non-transitory, computer-readable storage medium of claim 15, wherein the statements according to the workflow definition language further include fields specifying: a timeout specification for the task, and a heartbeat specification for the task;

wherein the program instructions, when executed:

set a heartbeat timer according to the heartbeat specification;

set a timeout timer according to the timeout specification;

receive one or more heartbeat messages from the task; and reset the heartbeat timer in response to each received heartbeat message; and wherein the error indicates expiration of the heartbeat timer.

17. The non-transitory, computer-readable storage medium of claim 16, wherein the statements according to the workflow definition language further include fields specifying: a timeout specification for the task, and a heartbeat specification for the task;

wherein the method further comprises receiving one or more heartbeat messages from the task; and wherein the error indicates expiration of the timeout timer without an indication of the task completing successfully.

18. The non-transitory, computer-readable storage medium of claim 15, wherein the retry field further includes:

a specification of a list of error conditions;

a specification of a retry interval;

a specification of a backoff coefficient;

a specification of a maximum retry interval; or a specification of maximum attempts; and wherein the list of error conditions in the retry field includes an error condition for the error, and wherein the workflow service is further configured to:

determine that the error condition has been set during execution of the task;

match the error condition from the determining of the error condition in the list of error conditions; and retry, in accordance with the specification of the retry field of the current state, the execution of the task.

19. The non-transitory, computer-readable storage medium of claim 18, wherein the retry interval in the retry field specifies a retry interval of time, and wherein the workflow service is further configured to:

prior to the retry of the task, wait to retry the task for an interval of time corresponding to the retry interval of time.

20. The non-transitory, computer-readable storage medium of claim 18, wherein the backoff coefficient specifies a coefficient value, wherein the maximum retry interval specifies a maximum retry interval of time, wherein the maximum retry interval specifies a maximum retry interval of time, wherein the maximum attempts specifies a maximum attempts value, and wherein the workflow service is further configured to:

determine that the error condition has been reset;

match the error condition to the error condition in the list of error conditions;

determine another interval of time; and retry the task after an interval of time corresponding to the other interval of time has elapsed.

* * * * *